US010185761B2

(12) United States Patent
Mahjoub et al.

(10) Patent No.: US 10,185,761 B2
(45) Date of Patent: Jan. 22, 2019

(54) DOMAIN CLASSIFICATION BASED ON DOMAIN NAME SYSTEM (DNS) TRAFFIC

(71) Applicant: Cisco Technology, Inc., San Jose, CA (US)

(72) Inventors: Dhia Mahjoub, San Francisco, CA (US); Thomas M. Mathew, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 15/226,250

(22) Filed: Aug. 2, 2016

(65) Prior Publication Data

US 2017/0041333 A1    Feb. 9, 2017

Related U.S. Application Data

(60) Provisional application No. 62/239,661, filed on Oct. 9, 2015, provisional application No. 62/202,662, filed on Aug. 7, 2015.

(51) Int. Cl.
*G06F 17/30* (2006.01)
*H04L 12/26* (2006.01)
*H04L 29/12* (2006.01)
*H04L 29/06* (2006.01)

(52) U.S. Cl.
CPC .. *G06F 17/30598* (2013.01); *G06F 17/30864* (2013.01); *H04L 43/04* (2013.01); *H04L 43/0876* (2013.01); *H04L 61/1511* (2013.01); *H04L 63/1441* (2013.01)

(58) Field of Classification Search
CPC ....... H04L 29/06; H04L 43/04; H04L 61/1511
See application file for complete search history.

(56) References Cited

U.S. PATENT DOCUMENTS

| | | |
|---|---|---|
| 8,347,394 B1 | 1/2013 | Lee |
| 8,521,908 B2 | 8/2013 | Holmes et al. |
| 8,762,298 B1 | 6/2014 | Ranjan et al. |
| 8,775,604 B2 | 7/2014 | Levow et al. |
| 9,306,969 B2 | 4/2016 | Dagon et al. |
| 2007/0083670 A1 | 4/2007 | Kelley et al. |
| 2014/0007238 A1* | 1/2014 | Magee ................. G06F 21/577 726/24 |
| 2014/0215628 A1* | 7/2014 | Yan ..................... H04L 61/1511 726/25 |

(Continued)

OTHER PUBLICATIONS

Yadav, Detecting Algorithmically Generated Malicious Domain Names, Nov. 2010 (Year: 2010).*

*Primary Examiner* — Alexander Lagor
*Assistant Examiner* — Vu V Tran
(74) *Attorney, Agent, or Firm* — Edell, Shapiro & Finnan, LLC

(57) ABSTRACT

Techniques are provided herein for classifying domains based on DNS traffic so that domains that are malicious or associated with malicious activity can be identified. Traffic between one or more domain name system (DNS) resolvers and one or more authoritative name servers hosted on the Internet is analyzed analyzing at a server having network connectivity. A mismatch between a hostname and Internet Protocol (IP) information for the hostname is detected in the traffic and domains included in the traffic are classified based on the detecting.

18 Claims, 23 Drawing Sheets

(56) References Cited

U.S. PATENT DOCUMENTS

2015/0026809 A1\* 1/2015 Altman ............... H04L 63/1416
  726/23
2015/0215177 A1 7/2015 Pietrowicz et al.
2016/0065611 A1 3/2016 Fakeri-Tabrizi et al.

\* cited by examiner example for 69.162.76.38
%rwhois V-1.5:003fff:00rwhois.xyzcisconetworks.com (by Network Solutions, Inc. V-1.5.9.5)
network:Class-Name:network
network:ID:LSN-BLK-69.162.64.0/18
network:Auth-Area:69.162.64.0/18
network:Network-Name:LSN-69.162.64.0/18
network:IP-Network:69.162.76.32/29
network:IP-Network-Block:69.162.76.32 - 69.162.76.39
network:Organization-Name:Helm Nifterik
network:Organization-City:Amsterdam
network:Organization-State:OT
network:Organization-Zip:1082 KM
network:Organization-Country:NL
network:Tech-Contact;I:abuse@xyzcisconetworks.com
network:Admin-Contact;I:abuse@xyzcisconetworks.com
network:Updated-By:admin@xyzcisconetworks.com

FIG.5

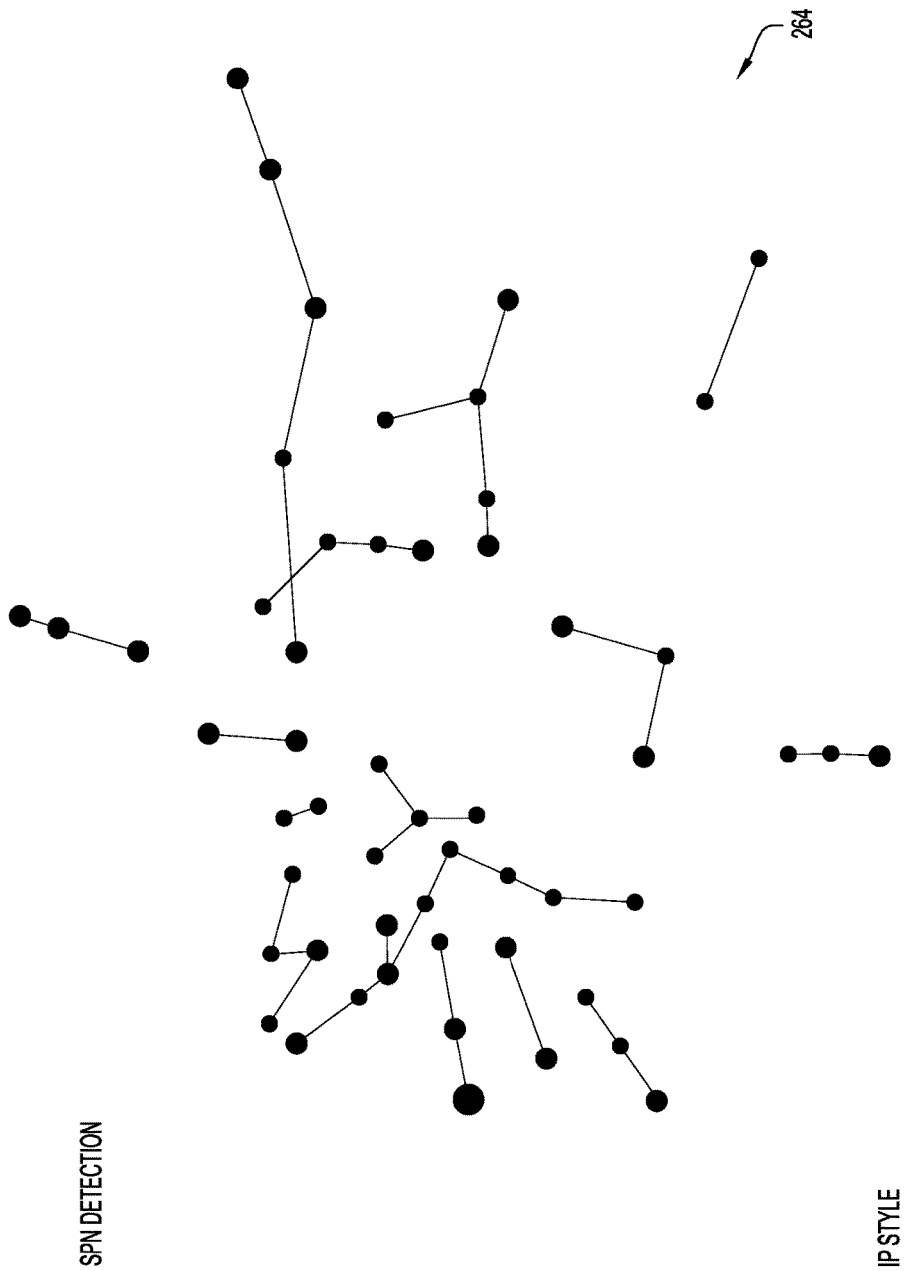

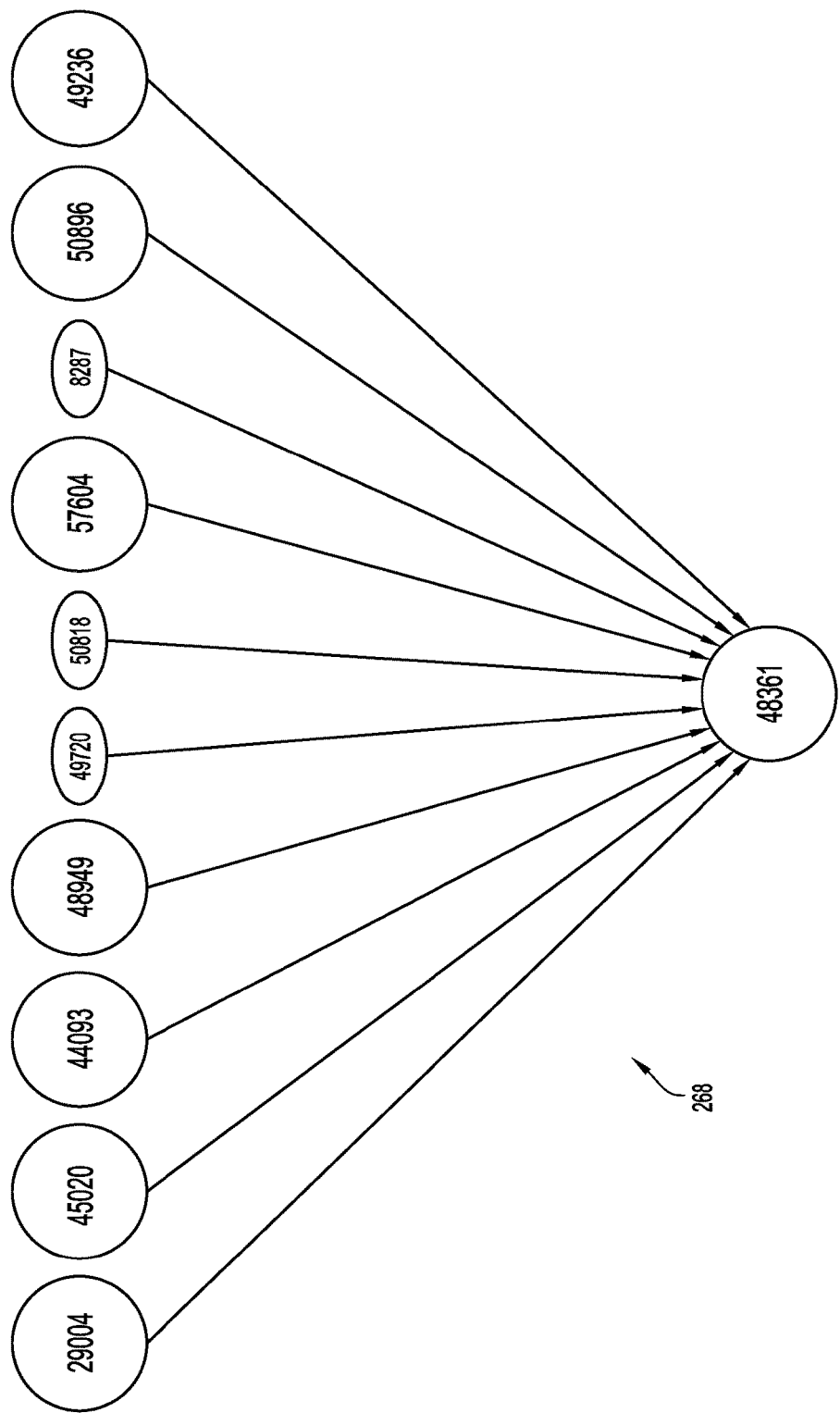

DOMAIN CLASSIFICATION BASED ON DOMAIN NAME SYSTEM (DNS) TRAFFIC

CROSS-REFERENCE TO RELATED APPLICATIONS

This application claims priority to U.S. Provisional Application No. 62/239,661, filed Oct. 9, 2015, entitled "Domain Classification Based on DNS Traffic," and to U.S. Provisional Application No. 62/202,662, filed Aug. 7, 2015, entitled "Domain Classification Based on DNS Traffic." The entire disclosure of each of these applications is incorporated herein by reference in its entirety.

TECHNICAL FIELD

Embodiments in accordance with the present disclosure relate to computer networks, and particularly to security in computer networks.

BACKGROUND OF THE INVENTION

Network resources such as those available via the Internet are accessed according to Internet Protocol (IP) addresses. IP addresses are represented numerically, traditionally as a quartet of values having the form 111.111.111.111. From the early inception of network computing, familiar alphanumeric name-based addressing has been used to allow users to more easily locate and remember the addresses for resources. For example, domain names are assigned to computing servers and clients. The Domain Name System (DNS) facilitates the translation between IP addresses and domain names by maintaining accessible records that associate one or more domain names with one or more IP addresses. Typically, over 70 Billion DNS queries are issued per day.

Malware such as computer viruses, Trojan horses, worms, botnets and the like is often distributed over the Internet as or with network resources. Numerous anti-malware products exist that detect, block and/or remove malware from devices. Over time, particular domain names may become associated with the distribution of malware. So-called block lists have been developed that list domains associated with malware. Domains may be identified for placement on a block list in numerous ways. For example, researchers can retrieve network resources and analyze the content of the resource for the presence of malware. Similarly, software can analyze the content of network resources to detect the presence of malware. Once identified, these domain names can be added to a block list and published for use by network devices. A client device or network router may block the transfer of content from a domain on a block list for example.

BRIEF DESCRIPTION OF THE DRAWINGS

FIG. 5 depicts an example of an extraction of the sub-allocated range for an IP address.

FIGS. 6C and 6D depict graphic representations of Autonomous Systems (AS's), with only peripheral nodes shown in FIG. 6D, according to an example embodiment.

FIGS. 6F and 6G depict a use case of the AS graph where peripheral AS's are tracked over a period of time, with FIG. 6F showing a portion of the AS graph at the first time and FIG. 6G showing the portion of the AS graph at a second, later time.

DESCRIPTION OF EXAMPLE EMBODIMENTS

Overview

Figure 1:
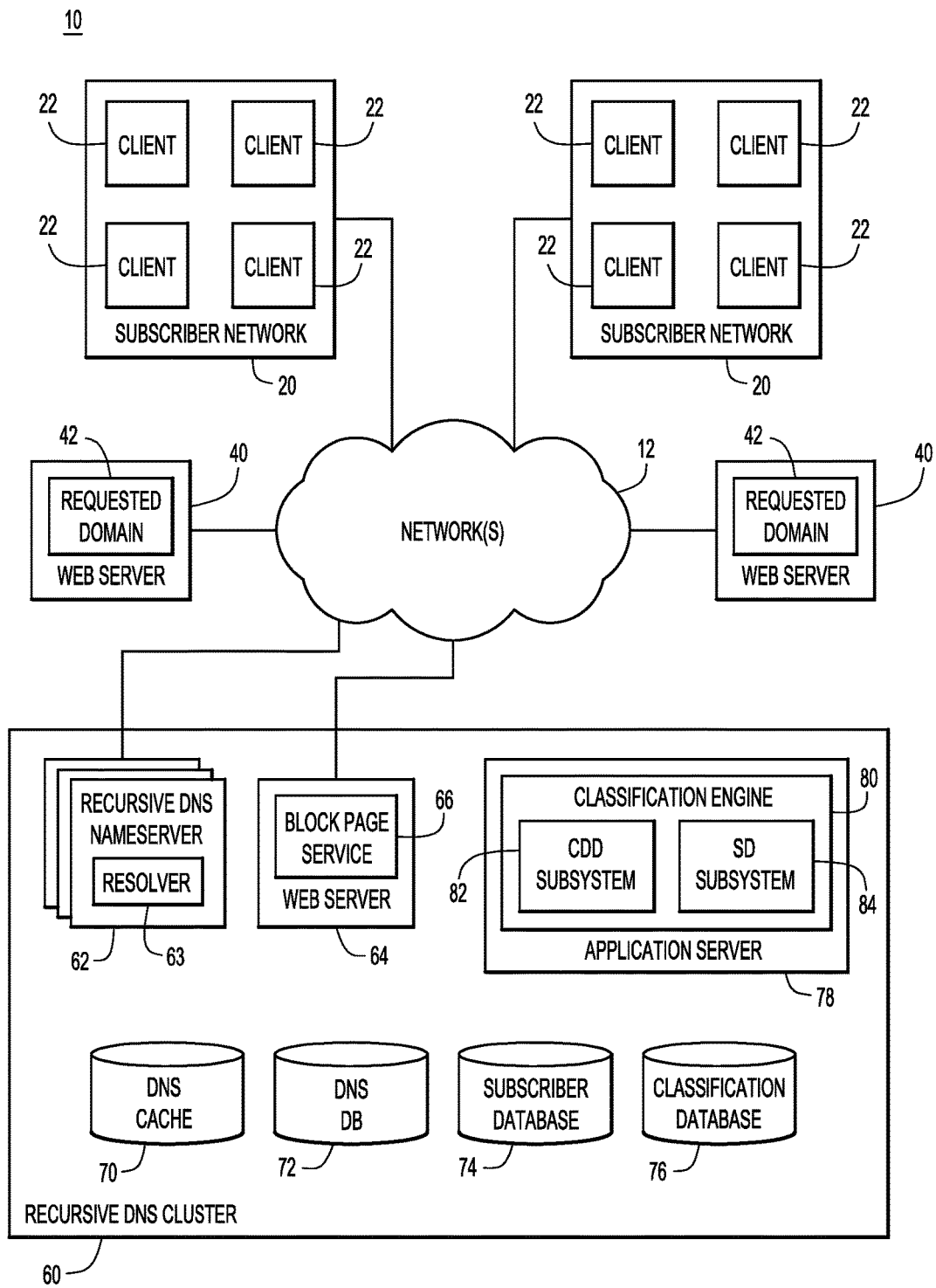
FIG. 1 is a block diagram of a computer network and depicting the generation and use of domain classification information based on network request behavior, according to an example embodiment.

Techniques are provided herein for classifying domains based on DNS traffic so that domains that are malicious or associated with malicious activity can be identified. These techniques may be embodied as a method, an apparatus, and instructions in a computer-readable storage media to perform the method. According to at least one example embodiment, traffic between one or more domain name system (DNS) resolvers and one or more authoritative name servers hosted on the Internet is analyzed analyzing at a server having network connectivity. A mismatch between a hostname and Internet Protocol (IP) information for the hostname is detected in the traffic and domains included in the traffic are classified based on the detecting.

Example Embodiments

Systems and methods for processing network traffic including Domain Name System (DNS) traffic and resource-level traffic are described. Domain classification based on DNS traffic is provided in one embodiment. The system provides for the detection and classification of malicious domains and/or Internet Protocol (IP) addresses based on an analysis of DNS traffic and/or monitoring of IP hosting infrastructures. The system analyzes DNS traffic below a recursive DNS name server level (e.g., traffic between one or more clients and one or more DNS resolvers and/or servers) and/or DNS traffic above the recursive DNS name server level (e.g., traffic between DNS resolvers and/or servers and one or more authoritative name servers hosted on the Internet), enabling a content and Uniform Resource Locator (URL) agnostic approach in one embodiment. Generally, various techniques are presented herein to efficiently discover suspicious reserved ranges of IP addresses and sweep en masse for candidate suspicious IPs and domains. The system provides actionable intelligence and preemptively detects and blocks malicious IP infrastructures prior to, or immediately after some of them are used to wage malware campaigns, therefore decisively closing the detection gap.

By comparison, techniques relying on domain reputation require complicated formulas and often depend on identifying groups of threats (e.g., Nxdomains). These techniques are often inadequate to track malicious domains that move quickly between multiple IP addresses, which have become more prevalent as the price of domains and subdomains has decreased, since many of these techniques were devised for an Internet of the past. Since DNS query patterns are more difficult for a user (e.g., a malicious actor) to control, analyzing DNS traffic provides a reliable manner of identifying malicious activities, such as exploit kits. Moreover, utilizing DNS traffic in accordance with the techniques described herein allows for the identification of malicious domains even when the domains are 'noisy' domains (e.g., domains with fast flux that change mappings frequently and/or bad IP/prefix reputation).

Generally, in one embodiment, the system includes a compromised domain detection (CDD) subsystem and a spike detection (SD) subsystem. The subsystems may operate independently or together in an integrated system to identify, classify, and subsequently route network traffic based on the classifications generated by the integrated system. These subsystems allow both inherent and acquired/assigned features to be identified and defeat/identify malware domains by tracking features that cannot be easily evaded on a global scale. For example, even though lexical, hosting, and registration features can be changed (e.g., through a DGA setup), traffic patterns that emerge globally from clients querying malware domains are difficult to obfuscate or change. Consequently, these traffic patterns are collectively tracked and analyzed by the CDD and SD subsystems. For example, the CDD and SD subsystems may analyze data, such as timestamps, client IP, domain queried, resolver queried, and Q-type in traffic below the recursive layer, as is described in further detail below.

Now referring to FIG. 1 for a description of a block diagram 10 of a system depicting an example of an implementation of the technology for domain classification that is described herein. In the system, subscriber networks 20, web servers 40 and a recursive DNS cluster 60 are each in communication with one or more network(s) 12.

Network(s) 12 and 20 can include any combination of local area networks, wide area networks (WAN), the Internet, and/or any other network. The recursive DNS clusters can vary by implementation and include any suitable computing system such as a server, group, grid, or distributed platform of computer systems configured to respond to requests for domain name information. While the cluster in FIG. 1 is depicted with multiple recursive DNS nameservers 62, other embodiments may include a single computing system within a cluster such as a single server. The individual recursive nameservers 62 in a cluster can be formed of hardware and/or software configured as described for domain name resolution. By way of non-limiting example, the various nameservers 62 can include personal computers, servers, workstations, mainframes, etc.

Each of the recursive DNS nameservers 62 in a cluster includes one or more resolver 63 configured to resolves requests for domain name information from other computing devices, such as clients 22. However, for simplicity, the nameservers 62 may also be described as resolving requests for domain name information when described herein. Additionally, although two subscriber networks 20 with four clients 22 each are shown, any number of subscriber networks or clients may be used. For example, a subscriber network may include a single client 22.

The nameservers 62 in cluster 60 include or are in communication with a local DNS cache 70, a DNS database 72, and subscriber database 74. While a single cluster is shown in FIG. 1, embodiments may include multiple clusters at various locations that share DNS, subscriber, and co-occurrence information. The domain name information stored in the cache 70 can be any type of information associated with a domain name. Some examples of domain name information are resource records, such as "A" records used for storing a 32-bit IP address associated with a domain name, "AAAA" records used for storing an IPv6 128-bit address associated with a domain name, and "CNAME" or canonical name records for a DNS alias. A request for domain name information can include a packet, cell, message, or signal used to ask for domain name information.

The DNS cache 70 at each cluster facilitates more efficient responses to DNS requests by storing domain name information such as DNS records corresponding to previously received DNS requests. The cache may also store other domain name information, such as pre-fetched domain name information. If the cache contains the DNS record(s) needed to respond to a DNS request, the DNS nameserver 62 can return the cached information without contacting other nameservers to fulfill the request. When DNS requests from client 22 or other computing devices cannot be fulfilled with cached domain name information, the recursive DNS cluster initiates recursive processing to determine the needed information. For example, a DNS nameserver 62 may first issue a DNS request to one of the root servers for generic top level domain information, followed by one or more DNS requests to various authoritative name servers, to determine the requested domain name information. The DNS nameserver 62 may then send a response to the client 22 that indicates a web server 40 on which a requested domain 42 is located.

A response can also include a packet, cell, message, or signal used for transmitting domain name information. A URL identifies resources available through network hosts. Some examples of URLs are http—HTTP resources, https—HTTP resources over Secure Sockets Layer (SSL), File Transfer Protocol (ftp)—ftp resources, mailto—E-mail address, Lightweight Directory Access Protocol (ldap)—ldap lookups, file—resources available on the local computer or over a local file sharing network, news—Usenet newsgroups, gopher—the Gopher protocol, telnet—the TELNET protocol, and data—the Data: URL scheme for inserting small pieces of content in place. Typically, a URL includes domain names that form a portion of the URL.

In response to a DNS request for domain name information associated with a domain name, a recursive DNS nameserver within a cluster can determine a client identifier. A client identifier discriminates the sender, owner, user, or subscribing entity associated with the request for domain name information. Some examples of a client identifier are IP addresses, user id's, and secure tokens. If an IP address identifier is used, the recursive DNS nameserver 62 can inspect the network packet containing the request to determine the source IP address of the packet. A username or secure token may be included in the request for domain information from which the recursive DNS nameserver 62 determines the client identifier and the client information. In one example, a device or application on a subscriber's network is setup to modify DNS requests to include such identifiers.

In one example, the client identifier is a subscriber identifier and the client information is subscriber information. The client identifier can identify the entire subscriber network or an individual client within a subscriber network. A subscriber is generally an individual and/or entity that agrees to service conditions of an operator of a recursive DNS cluster 60. Subscribers may range from entities operating large networks 20, such as those provided by a wireless service providers or large corporations, to individuals having a home internet connection. It is noted that while subscriber networks 20 are depicted with multiple clients 22, that is not required. In a simple example, the subscriber may operate a single personal computer as a client with an internet connection.

The recursive DNS nameserver 62 resolves a particular request for domain name information based on the subscriber information to generate a response. The recursive DNS nameserver returns the response to the client or a user associated with a client, providing the resolved domain name information in accordance with the subscriber information. By way of example, a substitute network (e.g., IP) address that satisfies a substitution criterion for the domain name in the request for domain name information may be obtained. The network and user records may specify one or more DNS resolution options, filters, features or other techniques for determining what IP address to resolve for a given domain name. For example, in providing DNS services to the DNS client, the DNS servers may provide resolved domain name information (e.g., information for a requested domain 42) or redirect the DNS client to another location based on subscriber information stored at the DNS servers that indicates how an end user wants the DNS servers to employ the DNS resolutions options or features. In various examples, the DNS cluster may provide various DNS resolution options or features, such as misspelling redirection, parental filters, domain blocking, or phishing protection through the DNS process.

The DNS nameserver may also provide alternate IP address information based on an IP address being on a block list or otherwise having a record at the cluster indicating that traffic should not be routed to the IP address. For example, the recursive DNS nameserver may determine that a domain name in a DNS request is not malicious, but may determine that the IP address returned by an authoritative nameserver for that domain name is suspicious or associated with malware and, thus, may provide alternate IP address information.

In some embodiments, a user or subscriber of a service provided by the DNS cluster may set one or more preferences or selections for how the options are to be enabled or otherwise applied when a DNS nameserver 62 resolves DNS queries associated with the user. Preferences or settings for a user or subscriber may be stored as subscriber information at subscriber database 74 or in one or more storage devices accessible to the DNS cluster 60. Upon identifying the user, subscriber information associated with the user may be used to alter the IP address in a DNS response that the user receives. For example, a user or subscriber may establish subscriber information that instructs the DNS nameserver 62 to alter responses to DNS requests that are associated with malware, adult web sites, potential phishing or pharming sites, and other sites deemed inappropriate by the user or to which the user wishes to block or filter access, etc. In FIG. 1, the web server 64 and nameserver 62 utilize a single database but individual databases containing the same information may be used in other embodiments.

Network records may be included in subscriber database 74 that specify preferences or selections for resolving domain name queries associated with a particular subscriber's network 20. A subscriber may set permissions and preferences in network records to indicate that certain preferences can be bypassed by particular users of the subscriber's network. For example, an administrator for a corporate network 20 may set up network records to allow certain users of network 20 to bypass particular preferences in the network records, such as those blocking access to certain domains. Additionally or alternatively, permissions and preferences for overriding network preferences may be included in user records. User records can include subscriber information for individual users or entities using the services of DNS cluster 60. An individual user may specify resolution preferences or selections that will apply to individual DNS requests issued by the user. DNS nameserver 62 can use a subscriber identifier such as a userid, token or other identifier to determine a corresponding user record for a particular request. The user records and/or network records may be used by a block page service 66 in processing user resource requests. User records and network records may be used together to determine a set of permissions or preferences for applying to any individual request for domain name information, or requests for actual resources as will be explained hereinafter. For example, a user may set a preference in a user record allowing access to a certain category of domains, while a network record may indicate that users are not allowed to override the network preference set by the subscriber. In this manner, the nameservers 62 and/or block page service 66 operating as set forth below may use both types of records in responding to a resource request or DNS request. This permits a user to define a set of user preferences that can be applied when using different subscriber networks 20.

The domain name records in cache 70 may be associated with or have therein one or more flags. A flag can be any indicator, marking, or symbol associated with a domain name. For example, a binary indicator stored in the domain name record can be used. A flag may be used to identify any type of information for a particular domain. For example, a flag may be used to mark a domain name as suspicious or untrustworthy, such as a site associated with malware or engaged in pharming or phishing activities. A flag may be used to mark a domain name based on the domain name or an IP address associated with the domain name being on a block list or blacklist for example. A flag may also indicate that a domain hosts illegal material, hate speech, pornography, material related to drugs or alcohol, or otherwise objectionable material that a subscriber does not wish to access or permit access to. Any number of flags can be used to create any number of categorizations for domain names. For example, flags denoting various levels of adult material may be used to classify domain according to their age-appropriateness. Different levels of security risks may be denoted by flags. Flags can also be set in domain name records to cause requests for a particular domain to be proxied. This can allow a subscriber to have traffic for certain domain names proxied, for example for logging, auditing and the like, while traffic for all other domains is not proxied.

When a request for domain name information is received, the DNS nameserver 62 resolves the domain name query using the subscriber information and any flags in the domain name record. For example, a network record for a DNS request may set a preference that a particular category of domains or a particular domain is to be blocked from access by devices on the network. If a DNS request is for a domain having a flag matching such a preference in the network record, the DNS nameserver 62 may generate a DNS response with a substitute IP address that directs the client device to an alternate domain. In one example, the DNS nameserver 62 provides the client device with domain name information associated with block page service 66 on web server 64. In response to the client device's resource request, the block page service can provide a block or landing page to the client device, for example, informing the user that the requested domain is not accessible on their network. The block or landing page refers generally to any resource or information provided by the block page service in response to a request for a target domain that is not an actual resource provided by the target domain.

A classification engine 80 is configured on an application server 78 to implement the functions of a CDD subsystem 82 and a SD subsystem 84, each of which are described in detail below. The classification engine 80 may also generate flags or other domain identifying information based on the classification information. The domain classifications are maintained in classification database 76 (and/or other storage device(s)). The domain classifications can be used to generate flags associated with the domain name records in DNS cache 70 in one example. In this manner, the DNS nameserver 62 can respond to client DNS requests using domain classifications generated by the classification engine 80 (and, thus, by the CDD subsystem and SD subsystem). Using the classification information, particular domains may be determined to be associated with malware or some other classification of domains. The classification engine 80, as well as other component, can update DNS cache 70 or other information with a flag indicating that the domain is associated with malware or some other classification. DNS or resource-level requests can be processed using the flags and subscriber information to generate DNS information or resources for the domain. This may include providing a block or landing page or DNS information for such a page in response to a client request.

Subscriber database 74 includes a log reflecting client DNS request behavior. The log includes a record of each DNS request received by a nameserver 62 from a client 22. The log can include a client identifier such as the source IP address of each request, a domain identifier such as the target domain or hostname of the request, and time information associated with the request. Similarly, DNS database 72 includes a log of passive DNS information exchanged between the DNS cluster 60 and clients 22 and/or the DNS cluster 60 and nameservers hosted on the Internet (e.g., root servers and nameservers).

DNS information, including information from the authoritative name server logs (authlogs) and query logs is stored in the DNS database 72. In some embodiments, the DNS database 72 stores authoritative name server logs (authlogs) that log traffic between one or more DNS resolvers and authoritative name servers hosted on the Internet. An authlog entry may provide the hostname, second level domain, host IP address, and an IP address of the responding name server, among other information. In other examples, an authlog entry may include less than the aforementioned data. Additionally or alternatively, the DNS database 72 may store query logs (querylogs) that track traffic between one or more DNS resolvers and the clients 22. A querylog entry may include an IP address of the client issuing a query and a hostname requested by the query, among other information.

In some embodiments, the authoritative logs can also be used to generate DNS logs that are maintained by the system in the DNS database 72. These DNS logs may be referred to as passive DNS logs and may include any or all of the same fields as authoritative logs. The passive DNS logs may also include domain name to IP address mappings and/or other DNS or IP-related information. For example, the passive DNS logs can include information recorded over time based on traffic between one or more recursive resolvers or name servers and the various authoritative name servers spread out across the Internet. The passive DNS logs may be used to generate historical records that represents domain name to IP address mappings over time. The historical records can then be used to trace the evolution of domain to IP address mappings, and the evolution of domain to name server mappings over time. This information is leveraged to provide protective security and reactive incident response.

Figure 2:
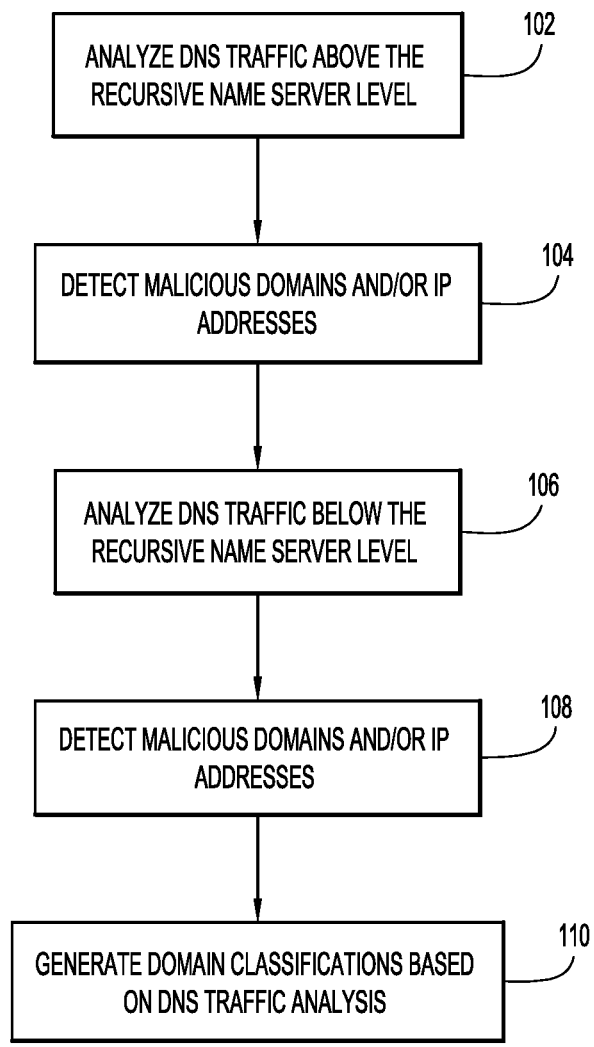
FIG. 2 is a high-level flowchart describing a method of generating classification information based on Domain Name System (DNS) traffic, according to an example embodiment.

Now referring to FIG. 2, a flowchart is now described of a method 100 for an integrated process of domain classification, according to an example embodiment. The method 100 utilizes DNS traffic information above and below the recursive level to make domain classifications, including classifications of hostnames, second level domains (SLD), and/or IP addresses. The classifications can then be used for routing DNS level or resource-level traffic across one or more computer networks.

At step 102, the system analyzes DNS traffic above the recursive name server (or resolver) level. In other words, the system analyzes traffic between one or more DNS resolvers and authoritative name servers hosted on the Internet. In some embodiments, this analysis involves accessing a stream of authlogs.

At step 104, the system, and in particular the CDD subsystem, detects malicious domains and/or IP addresses based on the analysis of the DNS traffic above the recursive level. Generally, the system detects malicious domains and/or IP addresses when a mismatch is detected between a hostname and the IP information for the hostname. In one example, the system performs detection by examining the Autonomous System Number (ASN) associated with the hostname and the ASN associated with the SLD of an authlog entry.

Each organization or entity on the Internet may be referred to as an Autonomous System (AS). Each AS is identified by an Autonomous System Number (ASN). ASN's are assigned in blocks by the Internet Assigned Number Authority (IANA) to regional Internet registries (RIR's), such as ARIN (American Registry for Internet Numbers), APNIC (Asia-Pacific Network Information Centre), LACNIC (Latin America and Caribbean Network Information Centre), RIPE NCC (Réseaux IP Européens Network Coordination Centre), and AFRINIC (African Information Centre). An RIR then assigns ASN's from the block assigned by the IANA to entities within that RIR's designated area. Each ASN has one or more prefixes. A border gateway protocol (BGP) is defined as a standard for exchanging routing and reachability information between AS's. An ASN is often associated with an Internet Service Provider, for example. It represents a set of routers operating under specific and/or multiple routing protocols and may represent a prefix under control of one or more network operators.

As is described above, in some embodiments, the system maintains records or other storage of passive DNS information including or based on information from the authlogs. The system may determine an IP address for a hostname using the historical records or authoritative DNS queries. The system may then determine an ASN for the hostname or a SLD using an IP address to ASN mapping service. This information may then be stored with the DNS information. A hostname may refer to any subdomain below a second level domain. It has been observed that hostnames or domains exhibiting fraudulent behavior are often hosted on ASNs that are different from one another. Accordingly, in some embodiments, the system determines that a domain is malicious when the hostname ASN and the SLD ASN are different (e.g., there is mismatch between the hostname ASN and the SLD ASN).

At step 106, the system and, in particular, the SD subsystem, analyzes DNS traffic below the recursive name server (or resolver) level. In other words, the system analyzes traffic between one or more clients and one or more DNS resolvers. In some embodiments, this analysis involves accessing a stream of query logs (querylogs). A querylog entry may include an IP address of the client issuing a query and a hostname requested by the query, among other information.

At step 108, the system detects malicious domains and/or IP addresses based on the analysis of the DNS traffic below the recursive level. In one example, the system performs detection by determining if a domain has experienced a recent spike or other increase in traffic below the recursive level. Various filtering and classifications may be performed based on the traffic analysis. Generally, the filtering removes any noise or traffic related to legitimate traffic while the classification determines whether suspicious domains are malicious or benign.

At step 110, the system generates domain classifications based on the DNS traffic analysis. Classifying domains may include classifications for second level domains, hostnames or subdomains, and/or IP addresses. As hereinafter described, these classifications may be used to route DNS traffic and/or resource-level traffic.

Step 110 may include generating domain classifications based on the results of either step 104 or step 108 independently so that if either the SD subsystem or the CDD subsystem detects a malicious domain, it can be categorized according to the subsystem's detection. In another example, the system may generate domain classifications based on a combination of the results of steps 104 and 108. For instance, a domain may only be classified as malicious if both the SD subsystem and the CDD subsystem indicate that it is malicious. In one embodiment, malicious domains are added to a block list so that the system will not route future network traffic (DNS or hypertext transfer protocol (HTTP), for example) associated with domains on the block list. The system may add hostnames, second level domains, IP addresses or other indications of malicious locations to one or more block lists.

In one embodiment, the system is configured to detect domains and/or ranges of IP addresses associated with exploit kits. Exploit kits are currently one of the most efficient infection vectors for delivering malware (e.g., malware delivery mechanisms). A successful exploit kit infection chain can drop anything from financial trojans, crypto-ransomware, info-stealers, and click-fraud or distributed denial-of-service (DDoS) bots. Exploit kit landing domains are commonly hosted on so-called bullet proof hosting providers or abused large providers. By leveraging a visibility into the attack surface in terms of DNS and IP traffic, the system is able to be built and deployed at scale. The detection is operative in real time to identify domain names, hostnames, and/or IP addresses associated with malicious activity, such as these exploit kits. The system is capable of identifying the domains and addresses prior to their use in launching an attack.

Figure 3:
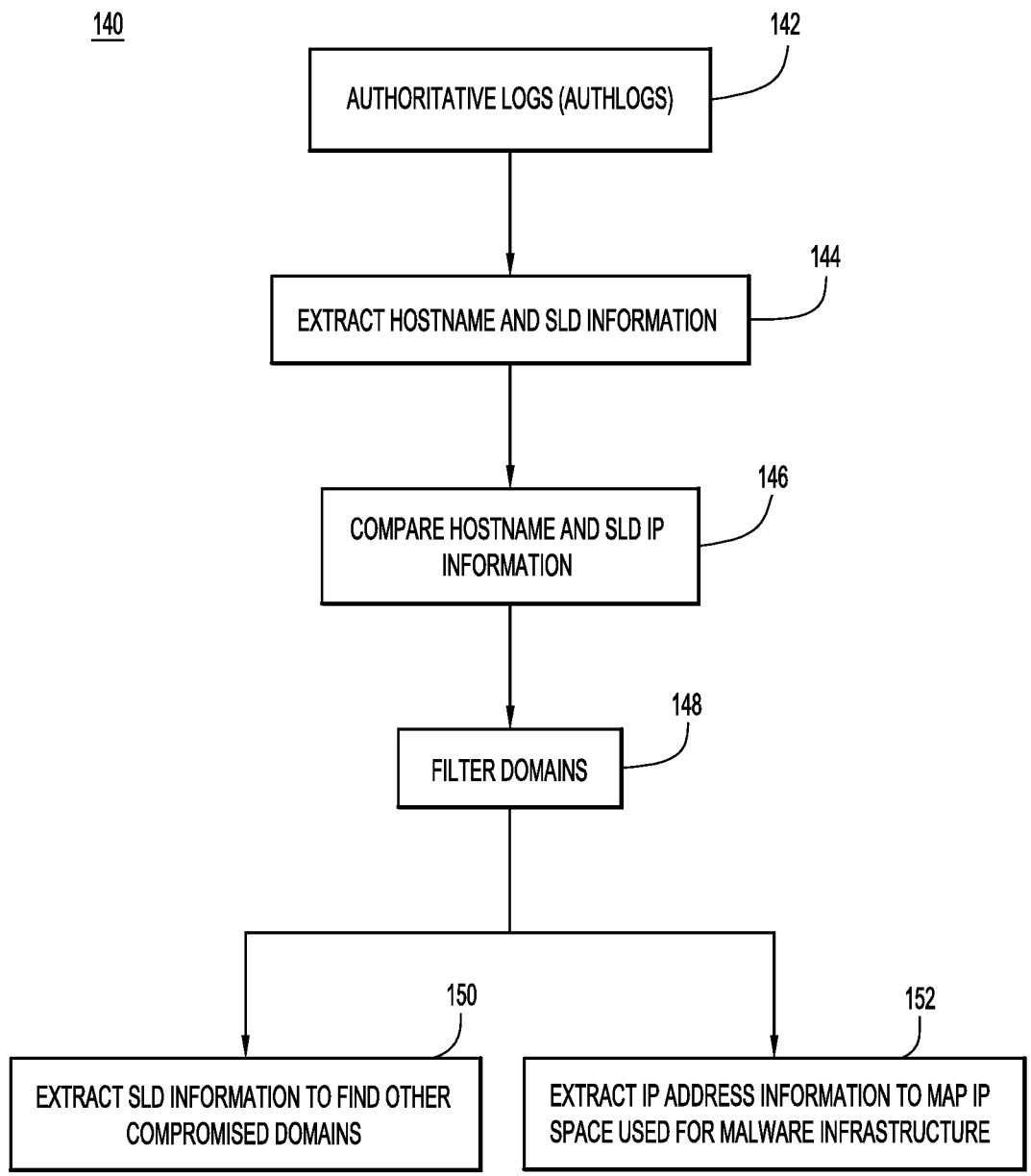
FIG. 3 is a high-level flowchart describing a method of generating classification information based on DNS traffic above a recursive nameserver level, according to an example embodiment.

Now referring to FIG. 3, a flowchart is now described of a method 140 performed by the CDD subsystem to detect and potentially block malicious domains or IP addresses, according to an example embodiment. Generally, the CDD subsystem utilizes DNS traffic above a recursive DNS name server level to detect and classify malicious domains. The traffic is typically captured in authoritative logs that are returned from authoritative name servers in response to DNS queries from a recursive DNS nameserver or resolver. The authoritative logs include DNS information such as an IP address for a hostname submitted in a query.

More specifically, the CDD subsystem reads the authoritative logs at 142. The system may read a stream of authoritative logs, or access a particular authoritative log based on a determination that a domain or IP address should be monitored or analyzed as hereinafter described. The main fields in an authoritative log include: hostname, SLD domain, hosting IP, IP of responding authoritative name server, UNIX timestamp, time-to-live (TTL), and DNS record type. An example of an entry from an authlogs stream is: 201848 actually.rootables.com rootables.com 85.143.216.82 208.109.255.42 1439211940 600 A.

At step 144, the CDD system extracts hostname and SLD information, including, the hostname and hostname IP address, the SLD and SLD IP address, the ASN of the hostname, and the ASN of the SLD. As mentioned, in some embodiments, the authoritative logs can also be used to generate DNS logs that are maintained by the system in one or more DNS databases.

At step 146, the CDD subsystem detects any hosting IP disparities, such as a disparity between the hostname and the SLD IP information as or after the CDD subsystem accesses the authoritative logs (e.g., reads a stream of authoritative logs). For example, the CDD subsystem may compare the ASN of the hostname and the ASN of the SLD to determine if they are the same.

Any SLDs having an ASN that does not match that of their hostname can be blocked by adding to a block list or otherwise setting a flag or providing an indication that the SLD is associated with malware. Alternatively, any hostnames and SLDs that do not have matching ASNs may be passed to a filter at 148 to selectively block SLDs having mismatched ASNs using additional criteria. The filter may remove any domains from a known legitimate space such as that of a large scale provider. The filter may also remove any domains that are whitelisted or that have whitelisted IP addresses. The filtering is optional. The system may block or otherwise blacklist any SLDs that are not filtered and for which the ASNs do not match.

For example, consider a scenario where the hostname skolaut-ongewassenst.fsibusinessmanagers.com is a hostname that resolves to the IP address 69.162.76.38 with ASN of AS46475, but the second level domain fsibusinessmanagers.com resolves to the IP address 184.168.221.19 with an ASN of AS26496, further filtering may be performed at step 148 and any subsequent steps (e.g., steps 150 and 152). The filtering may determine if the mismatch between the IP information (the IP address and the ASN) is an indication of malicious activity, as is discussed in further detail below.

Generally, the steps taken prior to filtering are effective at detecting compromised domains within large hosting providers. It has been observed that attackers have adopted a pattern of compromising thousands of domains registered with a single large hosting provider. These domains have SLDs that resolve to IP addresses within the ASN of the large hosting provider. For example, an attacker may penetrate a large hosting provider's system by accessing a registrant's account. The attackers may inject subdomains under the second level domains of the registrant's account. The attackers may provide resolution information through the authoritative name servers so that the subdomains resolve to IP addresses hosting landing domains for the malicious content such as an exploit kit. This content is hosted on IP addresses provided by other hosting providers, such as so-called bullet proof hosting providers or large abused hosting providers. Consequently, the IP addresses in the resolution information are not hosted or otherwise associated with the ASN of the initial large hosting provider that was compromised. In response to the detection of a disparity between the ASN of a hostname and the ASN of a SLD, the system may classify the SLD and/or hostname as malicious and may add the SLD to a black list. The system may also block future network traffic associated with the SLD or hostname. During these operations, the CDD subsystem retains host IP addresses of the SLDs and the host IP addresses of the hostnames.

Since, in some instances, malicious domains may not necessarily be associated with a large hosting provider, additional operations to detect malicious domains can be performed by filtering the domains further analyzing the data extracted from the authoritative logs (e.g., at step 144). In particular, the CDD subsystem may utilize information relating to the SLD and the hostname IP address to potentially identify additional malicious domains and/or IP addresses.

At 150, the CDD subsystem extracts SLD information to find other compromised domains. According to at least one embodiment, this involves extracting and pivoting around a registrant email addresses associated with a mismatched SLD (e.g., any SLDs that were identified as potentially malicious at step 146) to identify other domains that may be registered using the same email address. For example, the system may use a domain WHOIS database, to extract the registrant email address for each SLD. In some embodiments, the system may filter out bulk registrant emails such as "nocontactsfound@example.net" that are "dummy" or place-holder emails that are not malicious and are simply associated with a large number of SLDs.

Additionally or alternatively, the CDD subsystem may use a whitelist of email addresses (which may include the dummy or place-holder emails). If the email address is not whitelisted, the CDD subsystem extracts any other SLDs registered with the same email address as a mismatched SLD. A data store of SLD information such as a WHOIS database can be searched to determine any other SLDs that are registered to the same registrant email address. The system may classify the extracted SLDs as malicious and subsequently route network traffic for the SLDs based on the classification.

At 152, the CDD subsystem extracts IP address information to map the IP space used for malware infrastructure and find additional compromised IP space. In particular, the CDD subsystem may use the IP address of a mismatched hostname to determine a corresponding IP address range. For example, the system may access an IP WHOIS database to determine an IP address range associated with a mismatched hostname. These IP address ranges provide information regarding the IP space used for malware infrastructure. For example, small ranges of IP addresses with mismatched hostname and SLD ASNs may be blocked. Moreover, a hoster associated with the IP address range can be used to determine any other IP address ranges associated with the same hoster. An IPWHOIS database can be used to determine additional hoster information for searching to find other IP address ranges. These IP address ranges can also be blacklisted or otherwise blocked or subjected to further analysis. However, if an IP address range is large, further analysis, such as fingerprinting-based analysis, may be used before blocking a large IP address range. In some embodiments, an IP address range may be determined to be large if it is over a predetermined threshold (and small when under the predetermined threshold).

In one example, the CDD subsystem uses the hostname IP address of mismatched hostnames to extract a sub-allocated range of IP addresses for each hostname IP address. The CDD subsystem may take the host IP address of a mismatched hostnames and use an IP WHOIS database to extract the sub-allocated range of each IP address. If the sub-allocated range exists, it will be different from the BGP prefix of the IP address. The sub-allocated range represents a much finer granularity (smaller range of IP addresses) than the BGP prefix which typically represents a larger number of IP addresses. It can be more efficient to pivot around the sub-allocated range to identify related malicious IP addresses and domains than to use a much larger BGP prefix.

Figure 4:
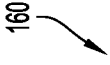
FIG. 4 depicts an example of an IP address to prefix mapping.

FIG. 4 depicts an example 160 of an IP address to prefix mapping that might be provided when using an IP to prefix (e.g., ASN) mapping system or service like the service provided at "http://asn.cymru.com/cgi-bin/whois.cgi." Notably, in FIG. 4, the IP address 69.162.76.38 is mapped to AS 46475. The mapping also indicates that the IP address has a BGP prefix of 69.162.64.0/18. As mentioned above, BGP prefixes are the unit of routing data exchange between internet routers. Routers on the Internet that communicate using BGP advertise prefixes with associated AS paths. The AS path represents a sequence of ASNs (or networks) that packets should be routed through (in the reverse order of the AS path sequence) to reach the destination. The prefix and AS path data propagates across the Internet and that is how routers build a better view of the internet for efficient packet routing.

FIG. 5 depicts an example 165 of an extraction of the sub-allocated range for the IP address "69.162.76.38." The IP address (or just IP) "69.162.76.38" is initially part of the BGP prefix "69.162.64.0/18." In FIG. 5, the prefix 69.162.64.0/18 represents 16384 IP addresses that are advertised in bulk with their AS path. The provider that owns the prefix 69.162.64.0/18 has also allocated a smaller range 69.162.76.32-69.162.76.39 (69.162.76.32/29 in CIDR notation) to a certain customer who most likely bought hosted servers from the provider. The IP6 9.162.76.38 is part of this smaller/29 range which represents 8 IPs. This finer granularity of 8 compared to 16384 may be more accurate for tracing usage of those IP addresses for any particular purpose, benign or malicious.

In this example, if the entire range happens to be used for hosting exploit kit domains, it will be safer to quarantine or block those 8 IP addresses than the entire 16384 block without any potential false positives. This "finer granularity IP range" may be generalized as a monitoring phase for all suspicious or malicious IP addresses that are detected in global DNS traffic. Such techniques may be efficient and accurate at predictively blocking malware campaigns at the IP level before any domains begin resolving to the suspicious IP addresses in question.

Figure 6A:
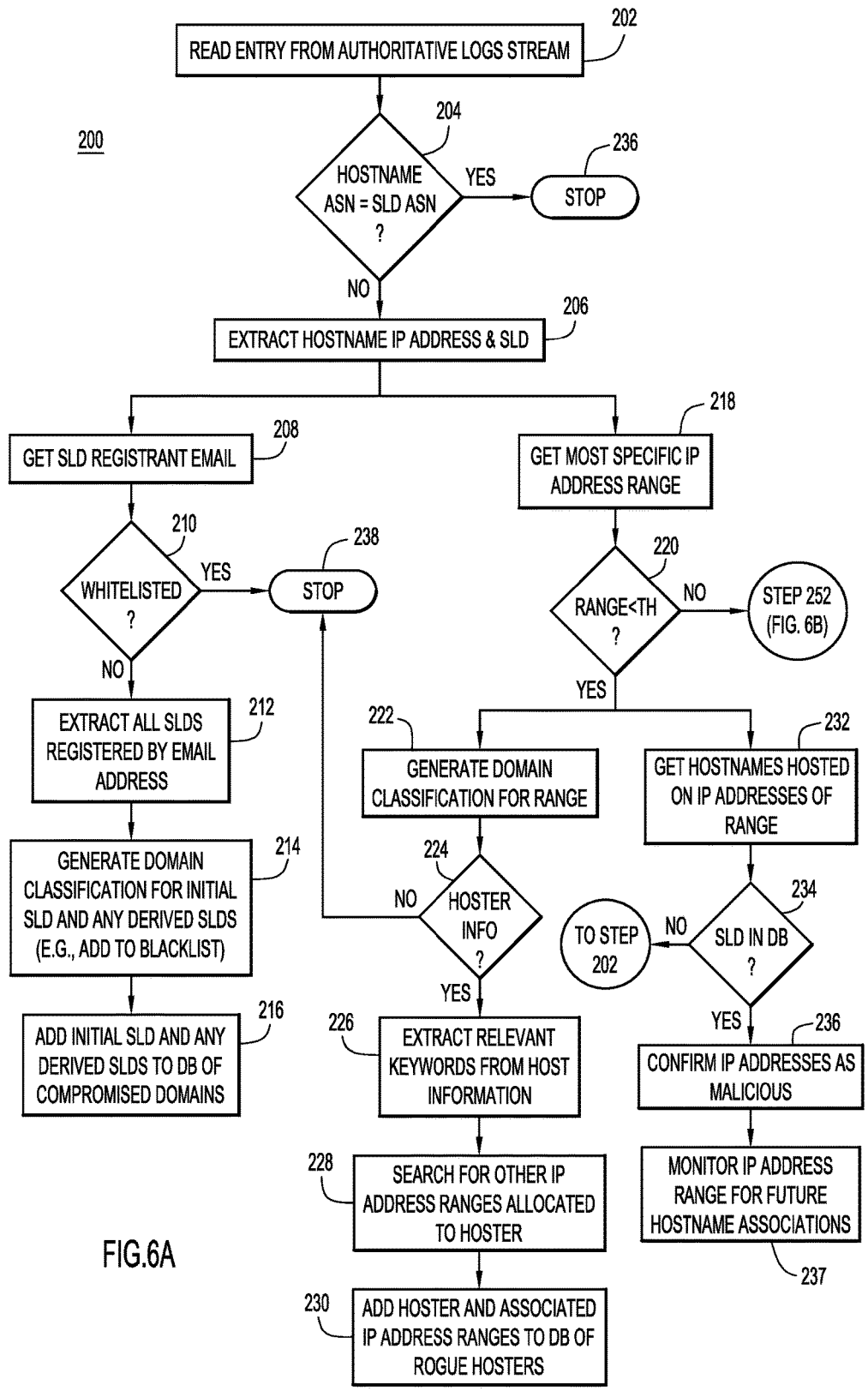
FIGS. 6A and 6B depict a flowchart describing a method of generating classification information based on DNS traffic above a recursive nameserver level, according to an example embodiment.
Figure 6B:
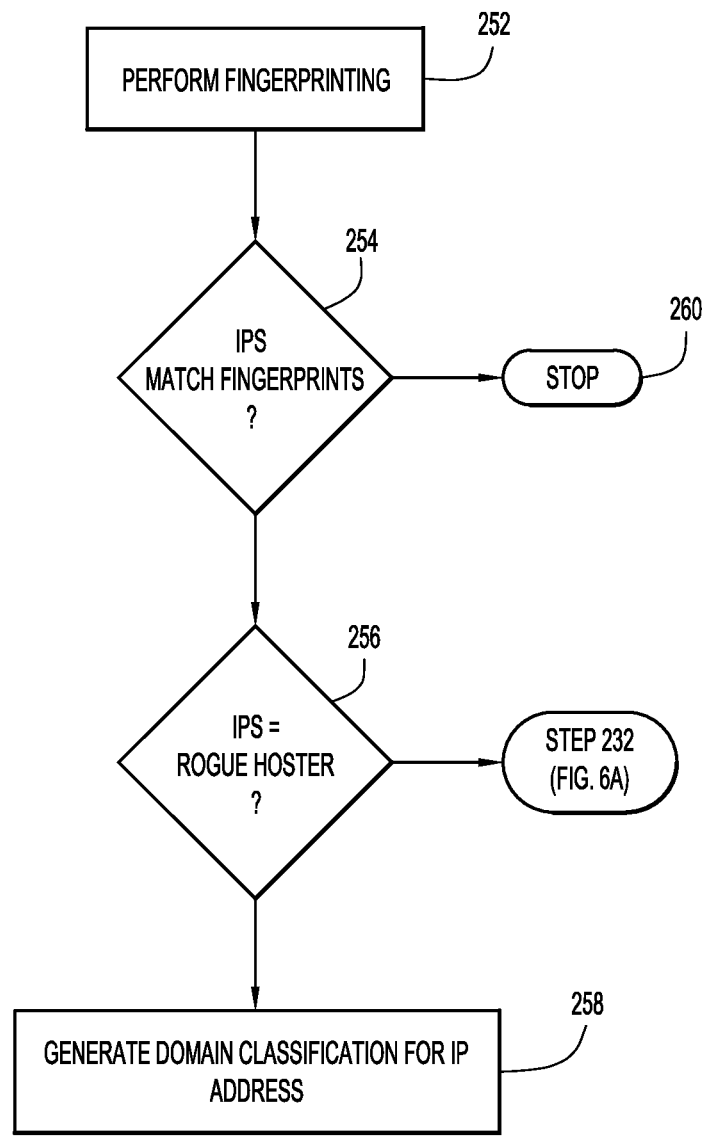

Now referring to FIGS. 6A and 6B, a flowchart of a detailed process 200 for generating domain classifications based on analysis of DNS traffic above a recursive name server level according to an example embodiment is described. As was discussed above in connection with FIGS. 1-5B, generally, the CDD subsystem may generate domain classifications including classifications for hostnames, second level domains, and/or IP addresses or IP address ranges.

At step 202, the CDD subsystem reads an entry from a stream of authoritative logs. At step 204, the CDD subsystem determines if the ASN of the hostname matches or is equal to the ASN of the SLD for the entry. If the ASNs match, the system stops at step 236 because the entry is likely legitimate or benign (e.g., not malicious). If there is an ASN mismatch, the CDD subsystem extracts the hostname IP address and the SLD of the authoritative log at step 206. In the depicted embodiment, the process branches after step 206, to further investigate or analyze the entry with different operations. The operations beginning at steps 208 and 218 may each potentially identify additional malicious domains and/or IP addresses and may be performed independently, concurrently, or at different times.

The operations beginning at step 208 pivot around the registrant email addresses to identify other potentially malicious domains. In particular, at step 208, the CDD subsystem retrieves the registrant email address associated with the extracted SLD. The CDD subsystem may get the registrant email address by querying a domain WHOIS database using the SLD as an input. The registrant email address is the email address provided by the registrant when registering a domain name. If a registrant's account is compromised, a number of domains registered under the same email address are likely to be compromised and associated with malicious activity as well. Thus, the registrant's email address serves as a pivot point from which additional malicious domains can be identified. In some instances, the registrant email address may be the email address of a legitimate registrant, but if the legitimate registrant has been compromised, an attacker may host malicious content in association with the compromised domain. Since the CDD subsystem can identify a malicious domain independent of the registrant email address, this allows for detection of compromised registrants (by comparison, simply reviewing the email address may not reveal the compromised domains).

At step 210, the CDD subsystem determines if the registrant email address is whitelisted. If the registrant email address is whitelisted, the system stops at step 238 (e.g., no further investigation as to whether the entry is malicious is performed). Whitelisted email addresses may be placeholder email addresses or bulk registrant email addresses. These email addresses may match a number of legitimate domains and malicious domains, but since these email addresses are on the whitelist, the system takes no further action to obtain additional domains that might be malicious based on an association with the email address.

If the registrant email address is not whitelisted, the CDD subsystem extracts all second level domains that are associated with the registrant email address at step 212. A DNS WHOIS database can be queried using the registrant email address to determine every domain registered using the email address.

At step 214, the CDD subsystem generates domain classification information for the initial SLD from step 206, as well as any derived SLDs from step 212. For example, the CDD subsystem can add the SLDs to a blacklist of domains or other list that causes network traffic for the domains to be redirected or dropped. As is discussed in more detail below in connection with the operations beginning at step 220, in some embodiments the initial SLD from step 206 may also be blocked or added to a block list in response to its ASN not matching that of the hostname. The system can perform such blocking without regard to the email address of the registrant.

At step 216, the CDD subsystem adds the initial SLD from step 206, as well as any derived SLDs from step 212, to a database or other data store containing an indication of compromised domains.

Now turning to the operations beginning at step 218, the CDD subsystem may also further analyze an entry based on the most specific IP address range associated with the IP address. As is described in more detail below, in one embodiment, the CDD subsystem determines a sub-allocated IP address range with finer granularity than the IP range represented by a BGP prefix. For example, the system may determine the IP address range associated with the IP address. The CDD subsystem may again use an IP WHOIS database to retrieve all information related to an IP address. Typically, an IP WHOIS database will provide a range of IP addresses using a BGP prefix. If there is a more specific range, the database will return that information indicating what range of IP addresses within the prefix the customer has bought or is otherwise associated with. For example, a /18 BGP prefix might be returned indicating a range of 16,384 IP addresses, but a WHOIS database entry might further indicate a /29 range to represent a smaller subset of eight IP addresses that a particular customer has purchased. Regardless, as mentioned, the operations beginning at step 218 may be performed in addition to or as an alternative to the operations beginning at step 208.

At step 220, the CDD subsystem determines if the IP address range associated with the IP address is smaller than a predetermined threshold. For example, in a system that utilizes 32 bits to represent a range of IP addresses, a variable number of bits may be used to represent subnets and a variable number of bits may be used to represent individual hosts or machines. In conventional IP addressing, the structure 000.000.000.000/00 is used where the bits to the left of the slash represent subnets and the number to the right of the slash refers to how many bits are contained in the subnet. The remaining bits are used to represent individual hosts or machines within the subnet. Consequently, in conventional IP addressing, as the number to the right of the slash increases, the number or range of IP addresses allocated to a particular hoster decreases.

If the IP address range is smaller than the predetermined threshold, the process splits to perform two branches beginning at steps 222 and 232. This additional analysis is performed because the CDD subsystem determines that smaller IP address ranges have a high likelihood of being malicious when the hostname and SLD ASN do not match.

At step 222, the CDD subsystem generates a domain classification for the range of IP addresses. For example, the CDD subsystem may add the range of IP addresses to a block list or otherwise block network traffic associated with the IP addresses. It is noted that the system may add IP addresses to a block list at step 222 for DNS routing, even when the SLD that resolves to those IP addresses is already on a block list. Thus, if different hostnames begin resolving to those IP addresses in the future, the DNS nameserver can reroute or otherwise not route the traffic to those IP addresses, even if the domain has not been identified as malicious. In other words, adding a particular IP address to the block list may serve as a predictive classification for future domains. By comparison, if the operations beginning at step 208 add a domain to a block list, the domain may be predicatively classified at multiple IP addresses.

At step 224, the CDD subsystem determines whether additional information is available about the hoster associated with the IP address range. The hoster refers to the person, organization, or other entity associated with IP address range. For example, the system may determine whether an IP WHOIS database provides more detail information about the hoster. If additional information is available about the hoster, the system extracts relevant keywords from the hoster information such as email address, name, etc., at step 226. Since there is no standard requirement for hoster information, different information may exist within a WHOIS database for a particular hoster. Alternatively, additional hoster information may not be available. If the additional hoster information is not available, the process stops at step 238.

If additional hoster information exists, the CDD subsystem searches the IP WHOIS database or other repository of domain information to determine any other IP address ranges allocated to the hoster at step 228. The CDD subsystem may search by a hoster's name, email address, or any other keyword to see if any other WHOIS entries match the keyword. The CDD subsystem then determines whether the other entries are owned or otherwise associated with the hoster, such as based on the strength of the match. If a matching entry is found, the CDD subsystem determines that the matching entry is for an IP address range that is also malicious and can be blocked. In some embodiments, the operations performed at step 218 and 220 can be performed for the matching entry to find another specific IP range associated with the same hoster. This enables the system to map the IP address infrastructure that this particular rogue hoster is using or otherwise operating on.

At step 230, the CDD subsystem adds the hoster and any associated IP address ranges of the hoster to a database or other storage of rogue hosters. Although not shown, the system may also add the derived IP address ranges to a black list automatically. In another example, the system may further examine the additional IP address ranges before adding them to a black list or blocking them. In one embodiment, after step 230, the system proceeds to step 232 to further process the derived IP address ranges (similarly, after step 237, the system may proceed to step 222). The system first determines the size of the range and then proceeds accordingly.

Now turning to the operations beginning at step 232, the IP addresses can be analyzed in view of SLDs that are already stored in a database, either in addition to or as an alternative to the hoster-based evaluation performed in the operations beginning at step 222. At step 232, the CDD subsystem retrieves the hostnames hosted on or otherwise associated with the IP address range from step 218. This information can be obtained using the authoritative logs maintained by the system as earlier described. The system may query passive database system data at the system to determine any hostnames that have previously resolved to the IP address range. The system may further monitor the authoritative logs to determine any hostnames that are associated with those IP address ranges in the future.

At step 234, the system determines if any of the hostnames have an SLD that is in the database of compromised SLDs. If a hostname has an SLD in the database, the CDD subsystem can optionally confirm, at step 236, whether those IP addresses are actually hosting malicious content similar to that associated with the original IP address from step 206. If the IP addresses are hosting malicious content, they can be added to a blacklist. If an IP address in the range is not confirmed as malicious, it can optionally be whitelisted.

The IP address range can optionally be added to a list of IP addresses to be monitored at step 237. The IP addresses have already been blocked but the system may monitor them to pick up hostnames that may be associated with those IP addresses in the future. The authoritative logs can be used to monitor the IP address ranges to determine what hostnames are associated with them. Those hostnames may be hostnames that have not yet been added to the compromised database or blocked. The CDD subsystem can process those hostnames beginning as described at step 202 when they are detected. Optionally, the system may automatically block the SLD of the hostname when it is detected and then utilize the registrant email to identify additional SLDs that can be blocked.

Now referring back to step 220, if the IP address range determined at step 218 is not smaller than the predetermined threshold, the process proceeds at step 252 as shown in FIG. 6B.

At step 252 of FIG. 6B, the CDD subsystem performs lateral network fingerprinting on the IP address range. Generally, the CDD subsystem performs port scanning on an IP address to develop a fingerprint or overview of the network configuration for the IP address. The CDD subsystem fingerprints the IP address initially identified at step 206 and either a subset of the other IP addresses in the IP address range (e.g., IP addresses in the range specified by /24) or all of the other IP addresses in the IP address range.

For each fingerprinted IP address, the CDD subsystem may scan all ports of the IP address or a subset of the ports. For example, the CDD subsystem may fingerprint ports on which services typically or historically used by malicious users run, such as ports for web servers, Secure Shell (SSH), etc. In some embodiments, multiple fingerprints may be generated for each fingerprinted IP address (e.g., a web server fingerprint, SSH server fingerprint, etc.). Additionally or alternatively, an overall fingerprint can be generated for each fingerprinted IP address. The CDD subsystem may discover various hosts and services at the IP address by sending packets to the target IP address and analyzing the responses. Scanning may provide host discovery, service detection, operating system detection, and port scanning to enumerate the open ports on the hosts, reverse DNS names, device types, and MAC addresses. In some embodiments, the CDD subsystem may use fingerprinting utilities such as NMAP (http://nmap.org), MASSCAN (https://github.com/robertdavidgraham/masscan), or other TCP/IP fingerprinting/scanning utilities.

At step 254, the CDD subsystem compares the one or more fingerprint(s) of the target IP address range with one or more fingerprints generated for the initial IP address extracted at step 206. The CDD subsystem may compare the fingerprints to determine if any of the IP addresses in the range have the same or similar fingerprints or configurations (e.g., web server fingerprint, SSH server fingerprint, etc.). As an example, if five IP addresses found in an IP range are hosting similar pattern exploit kit domains, the IP addresses may be analyzed to determine a fingerprint. For example, the fingerprint may be Port: 22/tcp, State: open, Service: ssh, Version: OpenSSH 6.op1 Debjan 4+deb7u2 (protocol 2.0); Port: 80/tcp, State: open, Service: http, Version: hginx web server 1.2.1; Service Info: Linux. Then, if any other IP addresses in the IP range have the same fingerprint, these IP addresses can be identified as malicious or likely to soon be malicious.

If the fingerprint of an IP address matches that of the initial IP address, the CDD subsystem determines, at step 256, whether the hoster associated with the IP address range is a known rogue hoster. The CDD subsystem may check a DB of rogue hosters to determine whether the hoster for the IP address range has been associated with malicious activity in the past. If the hoster is known to be a rogue hoster, a malicious domain classification for the range of IP addresses is generated at step 258. The large range of IP addresses may be added to a blacklist or otherwise identified so that network traffic is not routed to these IP addresses.

If the hoster is not known to be associated with malware or other such malicious activity, the process returns to step 232 of FIG. 6A to determine the hostnames associated with the IP address range. If the fingerprints for the IP address range do not match that of the initial IP address at step 254, the process stops at step 260.

Still referring to FIGS. 6A and 6B, it is noted that in some embodiments, the CDD subsystem may not employ a threshold at step 220. In such a case, the system may generate a domain classification at step 222 for any size range of IP addresses. Additionally or alternatively, in some embodiments, the system abstracts away from the ASN view. The system builds an AS graph and then investigates its topology to uncover hotspots of malicious or suspicious activities and monitor our DNS traffic for new domains hosted on these malicious IP ranges. This enables a unique method of identifying seemingly autonomous networks that are actually operated by one organization, which helps further identify potentially malicious areas of the Internet with finer granularity, as is described in further detail below in connection with FIGS. 6C, 6D, 6E, 6F, and 6G.

Referring generally to FIGS. 6C, 6D, 6E, 6F and 6G, analyzing the topology of an ASN graph allows IP ranges in certain ASNs to be analyzed from another perspective and provides insight that cannot be learned by counting a number of bad IPs hosted on prefixes of an ASN. Generally, if the Internet was plotted as a graph of interconnected nodes, each node (e.g., dot) in the graph would represent an ASN. Each ASN has one or more prefixes and BGP allows traffic to travel between the ASNs. Using ASN data, including BGP routing tables from various publicly available databases, such as Cidr Report and the Oregon Route View Project, a visualization of portions of this graph can be built. In particular, a directed graph with nodes representing ASNs and directed edges pointing from an ASN to any upstream ASNs can be built. Then, based on this graph, relationships and patterns between various ASNs can be found or detected that, in turn, may provide an indication of maliciousness.

Figure 6C:
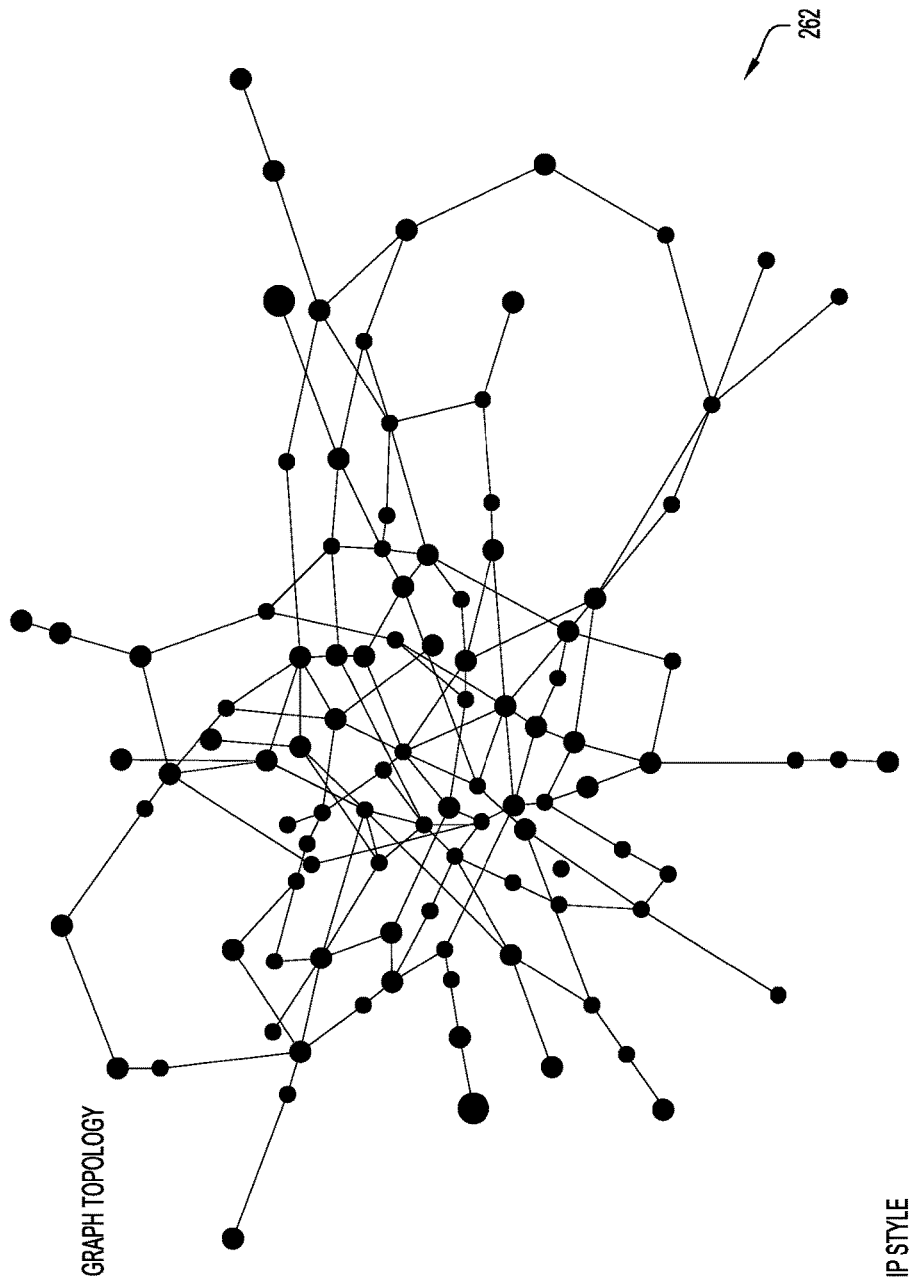
Figure 6E:
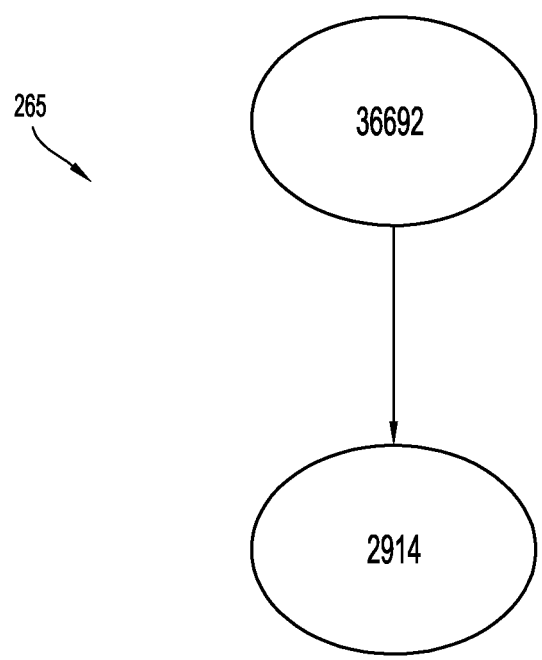
FIG. 6E depicts two of the nodes from the AS graphs of FIGS. 6C and 6D.

According to at least one example embodiment, the AS graph is built using the entire AS path on every prefix entry of a BGP table. The AS graph is built by parsing the BGP table line by line. An example AS graph 252 built in this manner is shown in FIG. 6C. Since many ASNs announce more than one prefix, thereby creating data from hundreds of viewpoints on the Internet, hundreds of paths are available to a single Origin AS. Moreover, since BGP tables are dynamic entities, constantly changing as new prefixes are announced, old prefixes are withdrawn, new ASNs are introduced and start advertising prefixes, ASN's cease to exist and withdraw all their prefixes, etc., the ASN graph is constantly shifting and changing. This dynamic state can be the result of multiple factors, including intentional technical and business decisions, human errors, hardware faults, route hijacking, etc.; but, generally most changes are new AS relations, new peers or previously unseen relations. Regardless, useful data can be extracted from the AS graph by including directed and weighted edges between the nodes representing the ASNs.

In the graph 262 weights that indicate usage may be assigned to each edge. Meanwhile, outgoing edges point to upstream ASNs and incoming edges originate from downstream ASNs. The upstream and downstream ASNs of every ASN can be learned by parsing the entries of the BGP table. Additionally, IP to ASN maps can be generated when parsing the BGP table via prefix to ASN mapping. More specifically, the prefix and the origin ASN data can be loaded into a radix tree which may reveal the best matching prefix, and consequently, matching ASN.

As an example, consider the following BGP data: TABLE_DUMP2|1392422403|B|96.4.0.55|11686|65.215.94.0/24|11686 4436 2914 33692|IGP|96.4.0.55|0|0||NAG||. In this example, 65.215.94.0/24 is an example network prefix and 11686 4436 2914 33692 is the associated AS path. The ASN that appears at the end of the AS path is the origin ASN, such that the last ASN in the AS path is originating the prefix (e.g., the owner or the entity announcing it on behalf of a customer). The AS path reveals how the origin AS reaches the prefix announced by the left, the origin, AS. In this example it shows that AS 11686 relies on AS 4436 which, in turn, relies on 2914 to reach 36692. Not only does the AS path reveal useful topology information, it can also be used to determine business relationship between each of the ASNs. For example in this case it's likely that 36692 is a customer of 2914. Consequently, the AS path data can be used to build a directed graph, where an ASN is denoted by a node and directed edges between an ASN lead to upstream ASNs. Thus, for the example above, the following edges are built into the graph: 36692→2914, 2914→4436, 4436→11686. In contextual terms, 36692 is the origin ASN for 65.215.94.0/24, and 2914 is an upstream ASN of 36692 (the last ASN before reaching the origin ASN when packets are traveling towards an IP in the origin ASN), therefore that entry can be graphically represented, as shown in the two-node graph example 265 of FIG. 6E.

Once the AS graph is built, various features in the graph can be identified, such as source ASNs and leaf ASNs. A source ASN is an ASN that has only outgoing edges and no incoming edges (e.g., the ASN has only upstream ASNs that it relies upon for connectivity and for propagating its prefix announcements). A leaf ASN has a single outgoing edge and no incoming edge. This is often described as "stub" ASN in the BGP routing terminology. Together, leaf and source ASNs may be referred to as peripheral ASNs.

Now referring to FIG. 6D, once a set of peripheral ASNs are identified, the nodes representing these ASN's may be isolated, as shown in graph 264. Then, analysis may be performed on these ASNs to determine which of the peripheral ASNs share the same parent(s) (upstream ASNs). Any peripheral ASNs that share the same parent(s) may be referred to as sibling ASNs. Typically, suspicious peripheral ASNs that are siblings. Additionally, peripheral ASNs may be clustered by country or other geographic criteria. Clustering peripheral nodes in the AS graph by country, may reveal groups of ASNs that have been delivering similar suspicious campaigns. An example time-based analysis of sibling peripheral ASNs is described below in connection with FIGS. 6F and 6G.

Figure 6F:
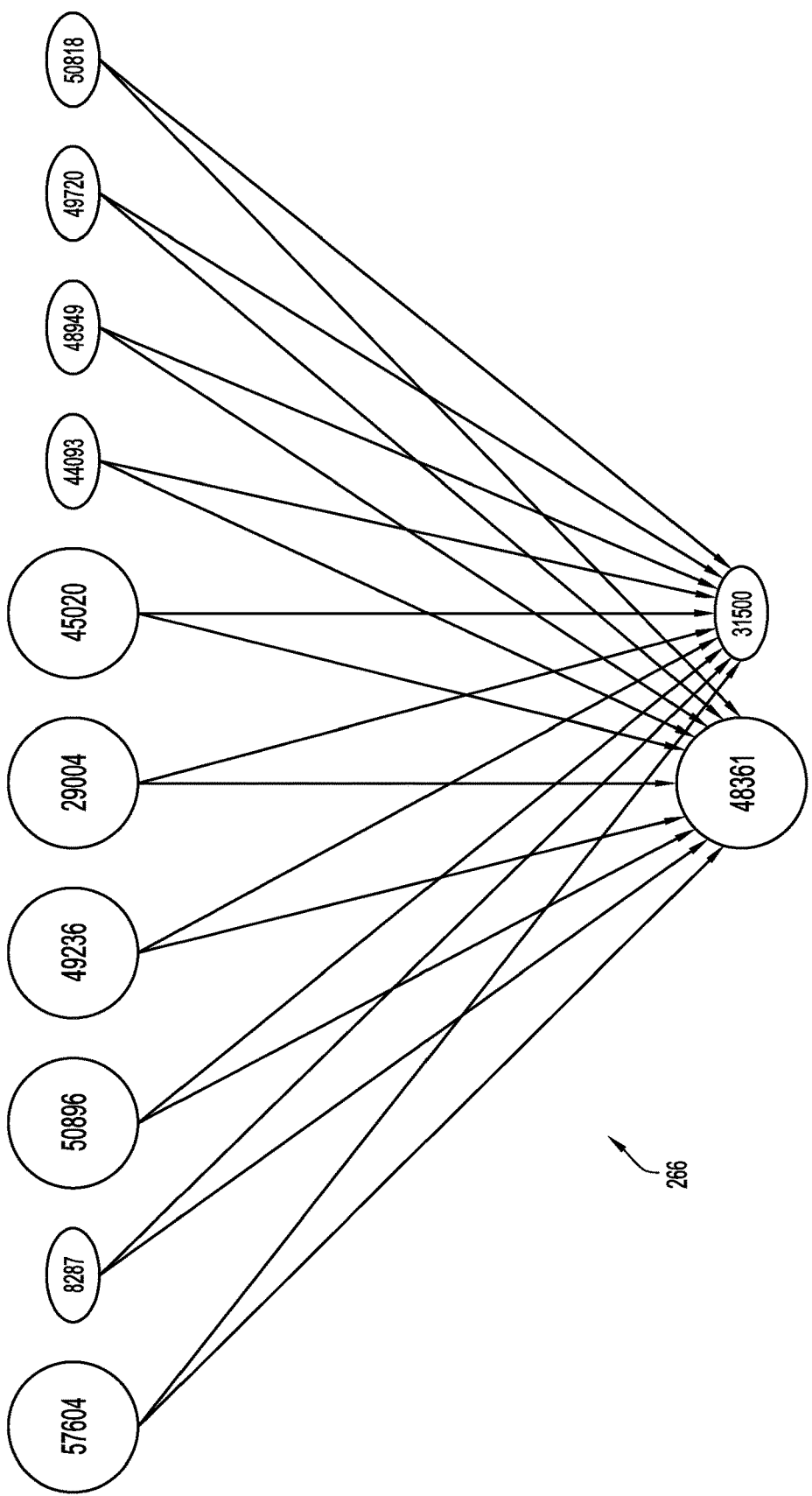

In FIG. 6F, a snapshot 266 of a suspicious ASN subgraph taken on a first date includes ten sibling peripheral ASNs (57604, 8287, 50896, 49236, 29004, 45020, 44093, 48949, 49720, 50818) sharing 2 upstream ASNs (48361 and 31500). From previous analysis at least one of these sibling peripheral ASNs was determined to be associated with malicious activity. Consequently, each of the siblings were investigated by the classification engine 80 (e.g., with CDD system 82 and SD subsystem 84). This analysis revealed that five of the ten siblings (were also hosting malicious payloads (57604, 50896, 49236, 29004, and 4502).

In FIG. 6G, a snapshot 268 of the same subgraph is shown weeks later. Now, additional leaves have started hosting the same suspicious payloads (via new resolving domains or directly on the IPs). Additionally, AS31500 detached itself from the leaves by ceasing to forward prefix announcements from the sibling peripherals. This detachment may tend to reveal evasive malicious activity. Additionally or alternatively, further analysis of sibling peripherals may reveal malicious activity. For example, if a large pool of contiguous IPs in specific prefixes of these ASNs are hosting the same payload, this may indicate malicious activity. In many cases, payload URLs may be live on the entire range of IPs before any domains were hosted thereon, IPs may be set up with the same server infrastructure, or have the same fingerprint. Each of these similarities may be an indication of malicious activity in sibling peripherals.

Figure 7A:
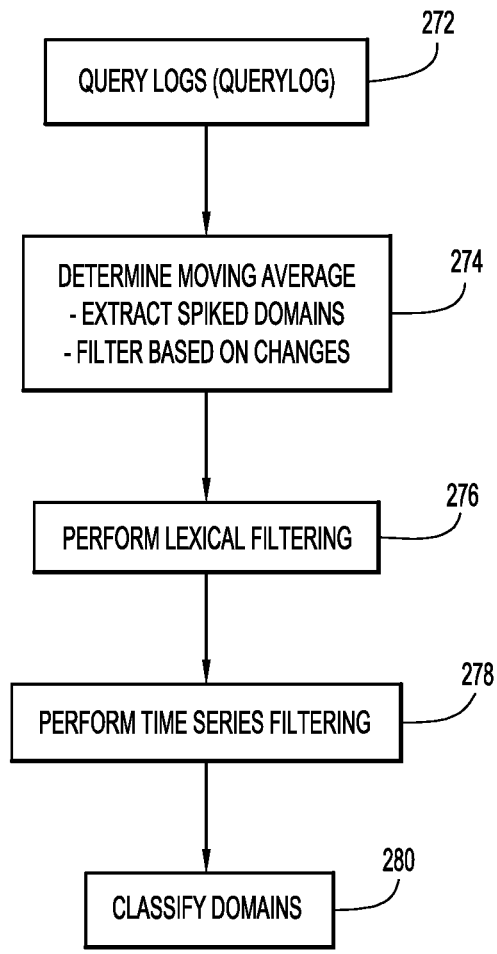
FIG. 7A is a high-level flowchart describing a method of generating classification information based on DNS traffic below a recursive nameserver level, according to an example embodiment.

Now referring to FIG. 7A, a flowchart is now described of a method 270 performed by the SD subsystem to detect and potentially block malicious domains or IP addresses, according to an example embodiment. Generally, the SD subsystem utilizes DNS traffic below a recursive DNS name server level. In particular, the SD subsystem analyzes DNS query patterns to identify domains hosting malicious activity such as exploit kits. These exploit kits can be used as seeds to find larger infrastructures. As mentioned, the SD subsystem may perform operations included in method 270 independently or together with CDD subsystem as the CDD subsystem performs operations included in method 140.

The SD subsystem is operative to detect and classify malicious domains based on a stream of query log data that can be accessed at 272. The query logs are DNS logs that include client DNS requests or domain lookups along with rcode and qcode information. In other words, the query logs track traffic between one or more client and one or more DNS servers or resolvers.

In an extraction stage at 274, the SD subsystem loads or otherwise accesses a time period (e.g., two hours) of querylog data. The SD subsystem calculates a moving average of query counts (number of queries received per domain) using the predetermined time period of data. For example, the system can extract spiked domains based on two consecutive hours of query log data, ten minutes of query log data, or any other time period. Analyzing the spikes based on a moving average over a predetermined period of time may increase the likelihood that queries for popular domains, such as major search engines, are not considered as spikes.

The SD subsystem processes the time period of query logs (e.g., using a map reduce job) to identify domains that have seen a predetermined percentage jump in traffic. In some embodiments, this may output from approximately 50,000 to several hundred thousand or more domains each hour. Consequently, the system may determine domain counts per hour and filter or remove domains based on a ratio change (e.g., that have seen counts under a predetermined threshold, thereby indicating no drastic change). The system may also remove domains where the traffic count remains unchanged over multiple time cycle (which may remove mail servers, blogs, etc.). Since, on their own, spikes typically do not provide a clear indication of malicious behavior, the data included in a detected spike (e.g., queries) must be analyzed to detect clusters, groups, and/or patterns of similar data in the spike. Consequently, the data (e.g., query data) extracted from a spike is filtered and analyzed after being extracted.

In a filtration stage at 276, the SD subsystem applies a set of filters based on domain lexical structures. For example, domain lexical filtering may involve filtering out or removing domains in the Alexa top 1 million or filtering out known dynamic DNS providers. In some embodiments, the system may also remove domains on a DNS blacklist or those that have recently been seen on a blacklist if it is determined that the domains are or were only on the blacklist because the domains were categorized as spam since spam domains are not nearly as dangerous as domains associated with exploit kits, but may have similar signatures. For example, if a blacklisted domain includes URIBL or spameatingmonkey, this domain can be filtered as spam. Additionally or alternatively, domains associated with known content delivery networks may be removed. A top level domain (TLD) parser is used in some embodiments. Whitelisted domains can also be removed.

In a time series filtering stage at 278, the SD subsystem obtains a time period (e.g., two weeks) of query counts for each domain. The time series data is passed through a high-pass filter which removes domains that have seen a certain amount of queries over the time period. This may also remove domains that had a consistently high amount of traffic, then a decrease, and then an increase back to the normal level. The time series filtering stage may also include convoluting with a set of functions. Put generally, the time series filtering performed at 278 may review a spike in view of historical traffic for a particular domain. In some embodiments, the time series filtering is performed subsequent to or as part of the classification stage, such that the historical traffic for a particular domain can be considered as a feature or factor during classification, instead of used as a filter prior to classification.

A classification stage is performed by the SD subsystem at 280. In some embodiments, the classification stage is performed subsequent to the filtering; however, in other embodiments, the classification stage may be preformed prior to the filtering in order to identify suspicious patterns or groups prior to filtering. Either way, in at least one embodiment, the domains classified at step 280 are passed to a classification engine. In some embodiments, clustering may be used to find similar groups. In these embodiments, the classification engine uses a set of features unique to each domain (number of unique IPs, unique resolvers, rcode distribution, query volume, query counts, etc.) to predict if the given domain may be potentially malicious. The classification stage may be tuned for imbalanced data sets. A corpus can be built using known Exploit Kits and those that are discovered. For example, the corpus may be the intersection of the outputs between the CDD subsystem and the time series filtering stage. In one example, the classification engine is a linear support vector machine (SVM) or a random forest. A hinge loss function can be used to minimize slight deviations.

In one example, a K-means algorithm may be used to detect clusters, groups and/or patterns. Briefly, K-means requires optimization of the distortion function: $\text{argmin}_s \Sigma_{i=1}^{k} \Sigma_{x \in S_i} \|x - u_i\|^2$. Then, a centroid that minimizes a mean around neighboring points can be found through an iterative approach in order to act as a least-squares estimator. The distortion function for a given K will indicate the global variance during the iterative process. As an example, when K=10, the following clusters may be found: {0:3841, 1:913, 2:835, 3:498, 4:395, 5:254, 6:52, 7:8, 8:7, 9:2}, when K=11, the following clusters may be found: {0:3401, 1:1064, 2:837, 3:480, 4:392, 5:315, 6:254, 7:45, 8:8, 9:7, 10:2}, and when K=12, the following clusters may be found: {0:3370, 1:1022, 2:839, 3:554, 4:389, 5:310, 6:254, 7:43, 8:8, 9:7, 10:7, 11:2}.

During this process, different features (e.g., query counts, number of unique IPs, resolver distribution, RCode distribution) can be chosen to pipeline and different numbers of clusters can be selected. Then, a matrix can be built and scaled be removing a mean and dividing by standard deviation (usually a Poisson or negative binomial distribution will be found and, thus, the scaling is performed). Additionally or alternatively, the samples can be mapped to a point cloud where each feature translates to a dimension and provides a visual indication of the contributions of each features. The impact of the features can also be determined with principal component analysis (PCA), which is a combination of linear algebra and statistics and involves calculating eigenvalues and eigenvectors of covariance matrix to determine a set of values of linearly uncorrelated variables for the utilized features. In one example, performing PCA on a scaled feature matrix (while subtracting out the mean) provided the following values: Query_Count: 0.337933892; Unique_Users: 0.20371146; and Unique_Resolvers: 0.13282715. In some embodiments, these features may then be considered in view of historical domain traffic, as is described in further detail below.

In addition to or as an alternative to the K-means analysis, a decision tree may be used to parse the data for clusters, groups, and/or patterns of similar data. This decision tree may, in essence, combine the filtering and classification, as the decision tree may classify domains as filtering occurs. An example decision tree is discussed in further detail below in connection with FIG. 7B.

If at step 280, a domain is classified or identified as potentially malicious; the domains may be added to one or more block lists for example and used to route network traffic accordingly. In one embodiment, the outputs of the CDD subsystem and the SD subsystem are combined to detect and confirm domains that are malicious. For example, if a domain is not identified by the CDD subsystem because there is no IP disparity or there is no malicious smaller IP range pattern, then the SD subsystem may identify the domain because of a traffic spike behavior. For example, malware delivery campaigns may typically show a spike behavior where dedicated newly registered or compromised domains are re-purposed for exploit kit redirection or malware delivery. Similarly, if the SD subsystem does not identify a domain having a spike in queries, the CDD subsystem may identify the domain because of an IP disparity or a malicious smaller IP range pattern.

In this manner, the system may provide effective detection of exploit kit and malware campaigns in a predictive as well as content and URL-agnostic fashion. The detection is predictive insofar as the system is able to pinpoint domains and associated IP ranges and block them before they start delivering exploit kit attacks on a larger scale. For example, if a first domain is detected with an exploit kit pattern (with the CDD subsystem, the SD subsystem, or both), the system can provide the smaller IP range and block the entire range before any further exploit kit domains are activated to infect Internet hosts in large malware campaigns. The system is content and URL-agnostic because it does not rely on a web proxy or URL regex pattern to detect these attacks. The system can utilize DNS traffic analysis and hosting IP infrastructure monitoring.

Figure 7B:
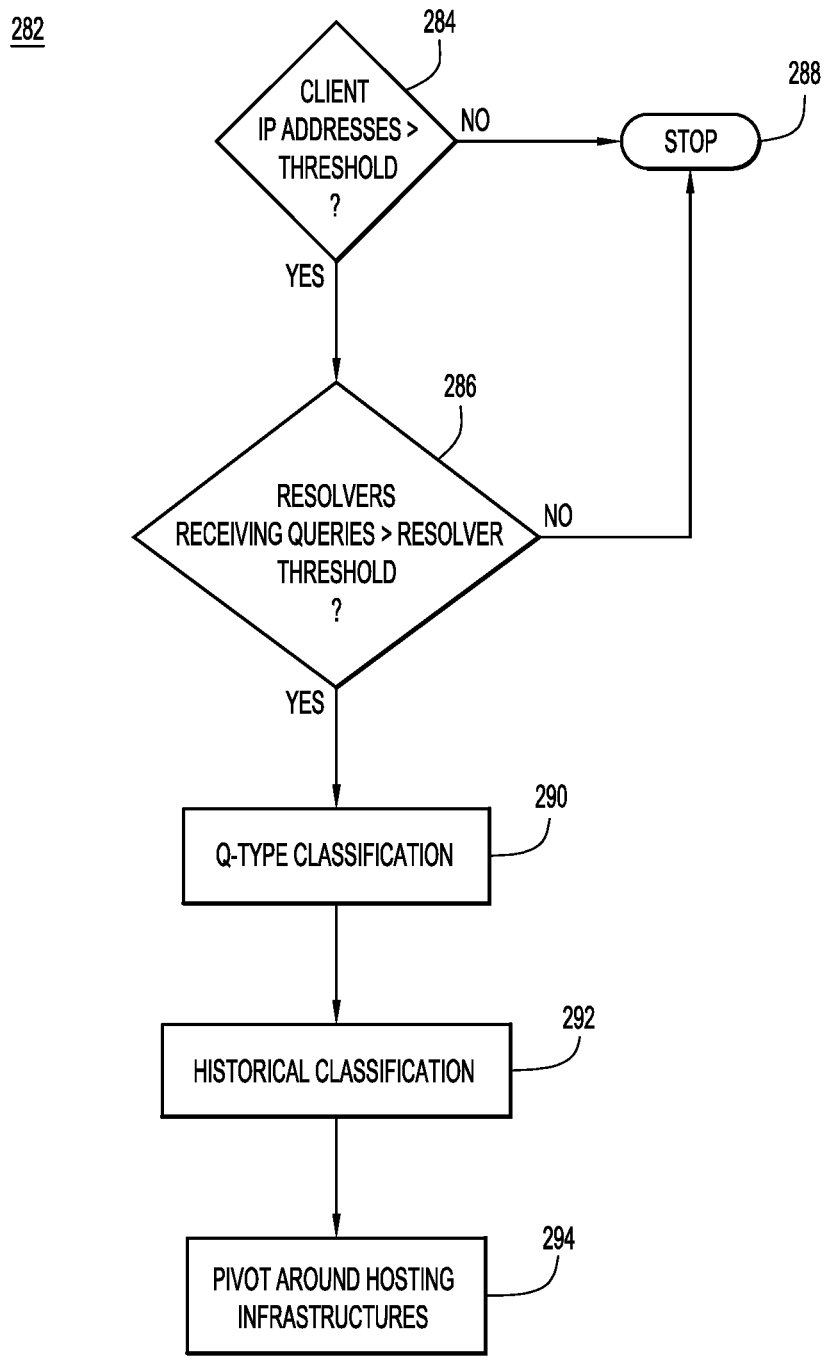
FIG. 7B is a flowchart describing a method of classifying information based on DNS traffic above and below a recursive nameserver level, according to an example embodiment.

Now referring to FIG. 7B, a flowchart is now described of a method 282 performed by the SD subsystem to classify domains or IP addresses (e.g., for step 280 of FIG. 7A), according to an example embodiment. In the particular embodiment depicted in FIG. 7B, an example decision tree is used to detect clusters or patterns; however, this is merely an example and in other embodiments, a decision tree with any number of questions or branches, of any complexity, may be utilized. Generally, the decision tree combines a set of weak questions to provide classifications. In at least some embodiments, the number of features (e.g., Q-type, unique IPs, unique resolvers, past history, etc.) utilized in the tree may increase or be increased as the amount of 'noise' (e.g., non-relevant or non-malicious queries) in a spike increases. Moreover, in some embodiments, the questions may be assigned weights, depending on the importance of the questions, such that the questions are not simply yes or no questions. For example, the questions may determine the number of IP addresses that were queried to cause a spike, the number of resolvers that received the queries in the spike, the breakdown of Q-types of the queries included in the spike (e.g., a ratio). As these questions are answered, weights or scores may be assigned and a determination of maliciousness may be made based on an overall score assigned to a domain. For example, if a score is over a predetermined threshold, the spike for a particular domain may be determined to be indicative of malicious activity.

In the particular embodiment depicted in FIG. 7B, initially, the client IP addresses queried in the spike are compared to a threshold at step 284. For example, if the threshold is three unique IPs, any domains with less than three unique IP addresses may be filtered out (at stop 285). However, as mentioned, in alternative embodiments, the number of unique IP addressed may be determined and assigned a score or weight. Next, at step 286, the number of resolvers receiving queries may be compared to a resolver threshold. If the number of resolvers satisfies the threshold, the SD subsystem may begin to classify the domain based on the Q-type of the queries included in the spike at step 290 (if not, the domain may be filtered out at stop 285). In this particular embodiment, the Q-type is classified with a weight or score based on the ratio of records included in the queries; however, in other embodiments, the Q-type could be analyzed with a series of questions, thereby providing additional branches of a decision tree. This filtering may allow the SD subsystem to distinguish between domain shadowing, exploit kits, and traffic to spam, casino sites, and other suspicious, but not necessarily dangerous or malicious, activity. For example, spam can be distinguished from exploit kits because the queries come from a single IP, while exploit kit domains have traffic from multiple IPs spread across several resolvers.

In some instances, the mere presence of a particular Q-type record may distinguish a domain as malicious and/or indicate the purpose of a domain, especially if a particular domain lacks any prior history. Moreover, the absence of a particular Q-type records may also indicated the purpose of a domain. For example, A and AAAA records are often included in spikes associated with malicious domains. By comparison, an MX record indicates that the domain has a mail server and, thus, may indicate that the domain is legitimate or spam. Since, in some instances, spam is viewed as harmless (at least by comparison to exploit kits), in some embodiments, the presence of an MX record may allow a domain to be classified as benign. SPF records have also been found to be associated with legitimate domains or spam and, thus, the presence of SPF records may not be indicator of maliciousness, but, at the same time, an SPF record may not indicate that a domain is benign like an MX record does.

Still further, in some embodiment, the Q-type classification may allow a spike to be partitioned so that related portions of a spike can be detected. Then, the partitions may each be analyzed with respect to known characteristics for a given Q-type partition to detect any irregularities or inconsistencies. The partitions may also provide smaller data sets that can be more easily analyzed for patterns. Q-types may be represented numerically (e.g., 1 for A Record, 15 for MX Records, 16 for TXT Records, 99 for SPF Records, and 255 for ANY records) and the spike may be partitioned using the equation $\Sigma_{n=1}^{5}$ nC5, which determines different combinations (C) of variables (n)). Often, only certain combinations of Q-records will be included in a spike. For example, many Q-type combinations, such as only SPF records, will never appear. In fact, in some instances, only 18 different combinations will be present. Additionally, in many instances, over 75% of the queries will be A records. Categorization rules can be determined based on these patterns.

As an example, it is has been found that around 4% of all domains are a combination of A Records and MX records (e.g., Q-Type (1, 15)) and are either distributed in a 50/50 manner or 99% A-records and 1% MX records. Regardless, of the distribution, queries with Q-type (1, 15) typically have a history and, thus, analyzing the Q-type may reveal that these domains are benign. Similarly, 2% of all domains may have the Q-type (1, 15, 16, 99, 255). These domains may also be associated with legitimate mail or spam (due to the presence of MX records) and any have extremely high spikes without any recent history, but the presence of the MX records (as well as the SPF records) may indicate that this spike is merely spam (or legitimate), as opposed to a more harmful exploit kit. At the same time, these records cannot be blindly labeled as spam, since the queries include a wide variety of Q-types. As yet another example, the Q-type partition for Q-type (1, 16, 99) includes approximately 0.138% of all domains and these domains include various history. In some instances, domains with the Q-type (1, 16, 99) include families of mail servers.

At step 292, a historical classification may be performed. The historical classification may be similar to the time series filtering performed at step 278 of FIG. 7A. For example, in some embodiments, all domains with more than a predetermined number of consecutive non-zero hours of traffic can be designated benign (e.g., removed from consideration/analysis as malicious), such that the only domains that are evaluated further have no recent traffic. In some instances, the historical classification may be performed to confirm a relationship between domains that is suspected based on Q-types. However, in other instances, historical classification may be performed prior to Q-type classification and the Q-type classification may confirm a classification of maliciousness based on historical data. For example, exploit kits typically do not have a history while domains with long, consistent histories are typically not maliciousness (in some embodiments the dispersion can be evaluated with the Fano factor to determine whether a history is consistent).

Once a domain has been classified as malicious, the SD subsystem may pivot around hosting infrastructures at step 294 to locate additional malicious domains, in a similar manner to the pivoting of the CDD subsystem described above. For example, if a domain is determined to be compromised, any subdomains injected under that domain can be analyzed and classified by the SD subsystem. In other words, the malicious domain can be used as a pivot to locate additional malicious or compromised domains under the same registrar. In at least one embodiment, this pivoting process is utilized to locate compromised domains on registrars that are not typically associated with domain shadowing or other such malicious activity. Additionally or alternatively, once a domain is determined to be associated with an exploit kit, a range of IP addresses surrounding the IP address of the domain may be analyzed for similar traffic, perhaps using the AS graph concepts described above in connection with FIGS. 6C-F. If these IP addresses are also hosting exploit kit domains, the domains can be checked to find other IP addresses to which these domains might resolve. Thus, if domain shadowing is occurring on multiple hosting IPs, the pivoting will reveal the network of malicious activity.

Figure 8:
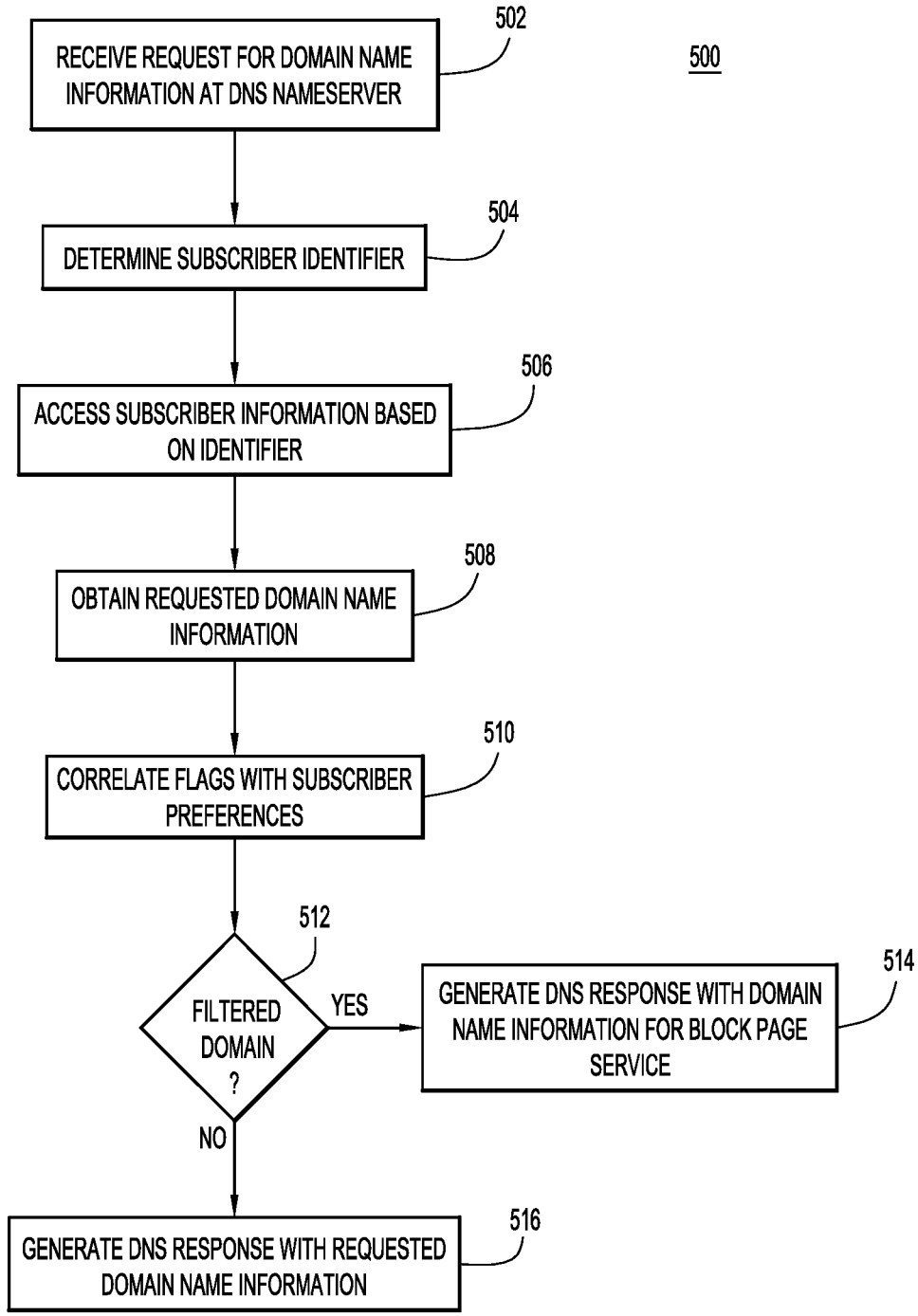
FIG. 8 is a flowchart describing a method of processing a DNS request based on domain classifications, according to an example embodiment.

Now referring to FIG. 8 for a description of a flowchart 500 describing a method of processing domain name requests by a recursive DNS cluster in accordance with one embodiment. Reference is also made to FIG. 1 for the description of FIG. 8. In the depicted embodiment, the techniques utilize the domain classifications generated by the CDD subsystem and SD subsystem; however, in other embodiments, the domain classifications from only one of the subsystems may be used.

At step 502, a DNS nameserver 62 receives a request for domain name information from a client device 22. In this example, it is assumed that the client device 22 is part of a subscriber network, and thus, that a unique IP address distinguishing the client device 22 from another client device 22 cannot be obtained. Consequently, at step 504, the DNS nameserver determines a subscriber identifier associated with the DNS request. In one example, the DNS nameserver parses the DNS request for the source IP address which is used as the subscriber identifier. At step 506, the DNS nameserver uses the subscriber identifier to obtain a corresponding network record from database 74. At step 508, the DNS nameserver obtains the requested domain name information. Step 508 may include determining the domain in the request for domain name information and checking cache 70 for a domain name record corresponding to the requested domain. If the cache 70 contains a domain name record for the requested domain and the record is not expired, the DNS nameserver 62 obtains the cached domain name record. If the cache 70 does not contain a domain name record for the requested domain or if the domain name record is expired, the DNS nameserver 62 attempts to retrieve the domain name information using one or more authoritative and/or root DNS nameservers.

After obtaining the domain name information, the DNS nameserver 62 determines whether there are any flags associated with the requested domain and if so, correlates the flags with the preferences in the network record at step 510. Step 510 can include determining if the domain information includes a flag indicating that a domain is associated with malware as determined by classification engine 80 in one embodiment. Step 510 includes determining whether the domain name information for the requested domain includes any identifiers corresponding to preferences in the subscriber information. For example, step 510 may include determining an age-rating for the domain and comparing that with an age-rating preference in the subscriber information record. Additionally or alternatively, a domain may include flags generated by the classification engine 80 (e.g., by the CDD subsystem 82 and/or the SD subsystem 84). Step 510 may also apply system wide preferences, for example for block listed domains or domains otherwise associated with malware. In this instance, the system will generate a response for the block page service in response to all requests for such a domain. In other examples, a subscriber may choose to override or otherwise not have these system wide preferences applied.

As examples, the classification engine 80 (including the CDD subsystem 82 and/or the SD subsystem 84) may detect exploit kits, such as Angler exploit kits, Nuclear exploit kits (which frequently include domains that only last less than a day), and Neutrino exploit kits, domain generation algorithms (DGAs), fake software and browser extensions, browlock, and phishing. Then the classification engine 80 may generate flags for any of these detected threats. More generally, the classification engine may detect domain shadowing (including domain shadowing with multiple IP resolutions), domains compromised by domain shadowing, large abused hosting providers, malicious hosters within larger hosting providers, and malicious offshore and diversified IP spaces (such as hosters registered in one country, hosting domains with ASN's in other parts of the world, which are likely to be malicious).

If any of the flags correlate to preferences in the network record, the DNS nameserver 62 determines if any of the flags and corresponding network preferences indicate that the traffic to the domain should be filtered at step 512. In one embodiment, step 512 includes determining whether the network records indicate that the requested domain should be blocked for requests from the subscriber's network. Step 512 may also include determining whether the records indicate that traffic for the requested domain should be proxied, but access still allowed.

If the domain name information contains a flag indicating that the requested domain should be proxied or blocked, the DNS nameserver 62 issues a DNS response at step 514 with domain name information for the block page service 336 at web server 334. If the domain is not to be blocked or proxied for the subscriber's network, the DNS nameserver 62 issues a DNS response at step 516 with domain name information for the requested domain.

Now referring to FIGS. 9A-E, for a description of example graphs depicting DNS traffic over time. These graphs illustrate examples of spikes caused by benign traffic and malicious traffic, including traffic associated with a nuclear exploit kit (FIG. 9C) and a phishing operation (FIG. 9D) and, thus, illustrate how a spike alone does not necessarily indicate malicious activity. Instead, features of the spike must be analyzed in accordance with the techniques described above in connection with FIGS. 2-8.

Figure 9A:
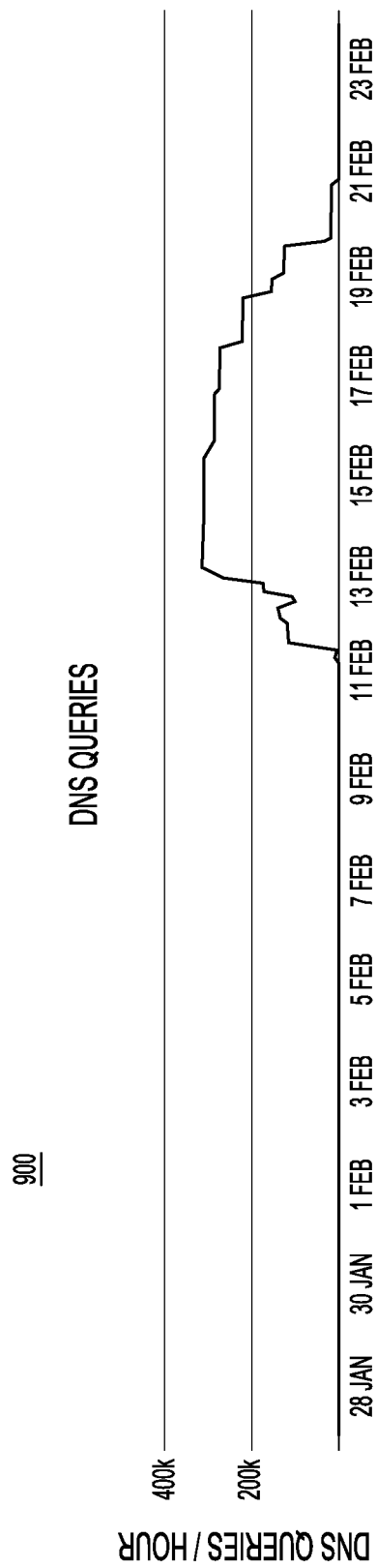
FIGS. 9A-9E are screen shots of an example user interfaces displaying graphs depicting DNS traffic over time.
Figure 9B:
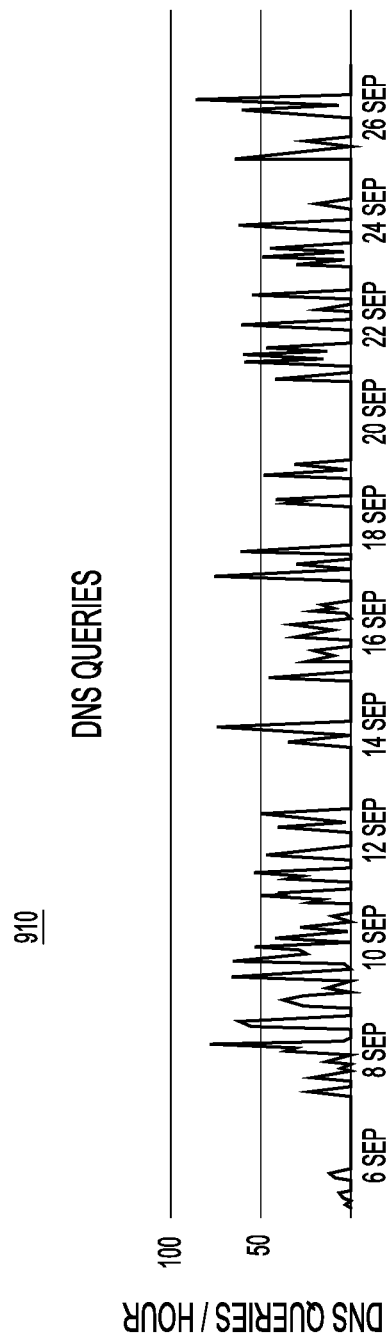

In the chart 900 shown in FIG. 9A, a spike in DNS traffic is caused by a DNS amplification attack. In an amplification attack, the attacker spoofs DNS requests to hide the source of an attack. Typically, the requests are received from servers that look valid and are embedded in traffic that looks valid. The techniques used herein can analyze the history of the domains (which is non-existent leading up to the spike), as well as other features of the queries included in the spike to detect this attack and flag the associated domains as malicious. Additionally or alternatively, the techniques herein can map the IP space associated with the attack to determine the true source, eventually pivoting about hosting infrastructure to detect and map the malicious attack. By comparison, in FIG. 9B, chart 910 depicts spikes that are associated with a legitimate (e.g., benign and uncompromised) domain. Notably, the DNS traffic for this domain includes frequent spikes over time, which is not typically associated with malicious domains.

Figure 9C:
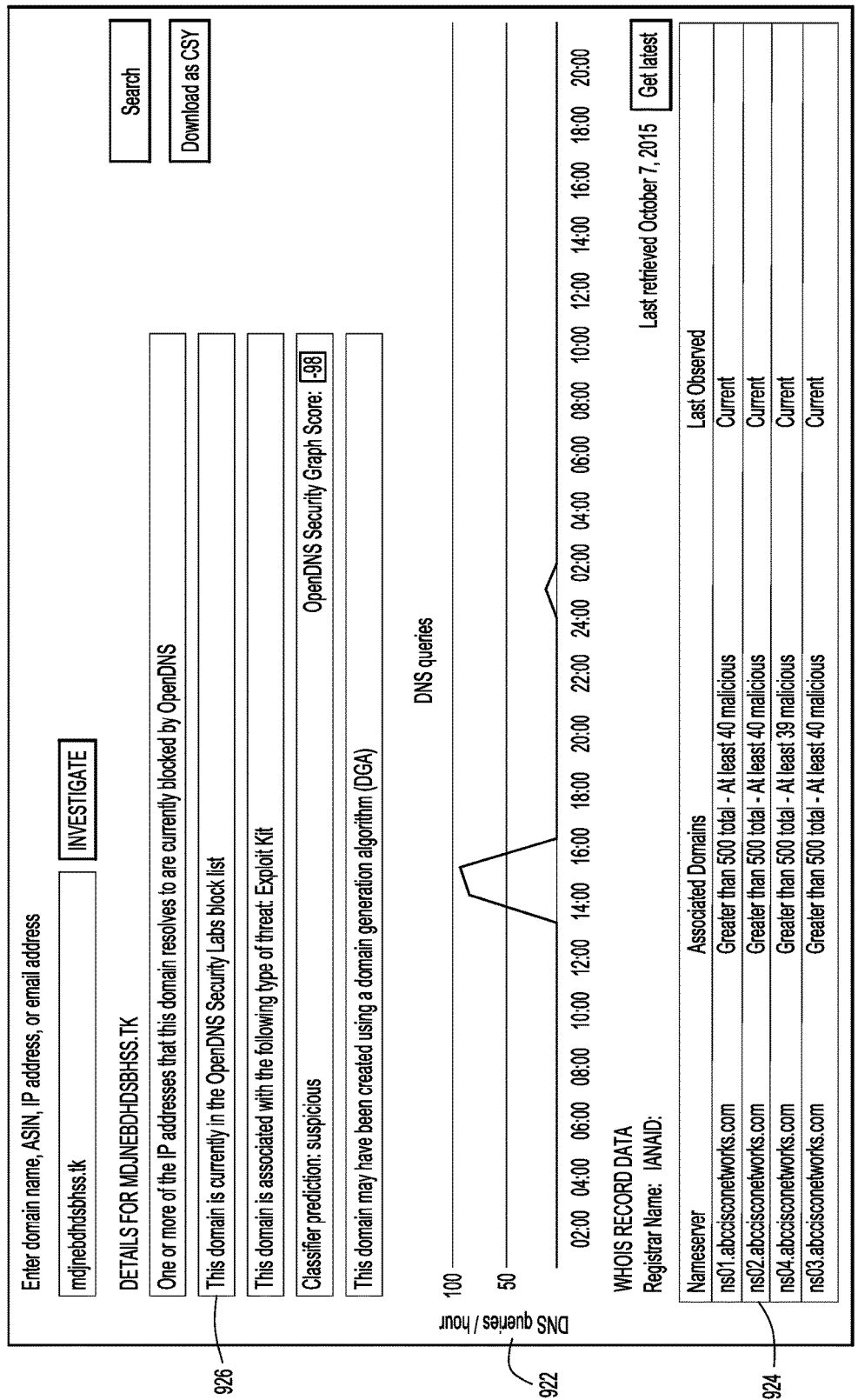
Figure 9D:
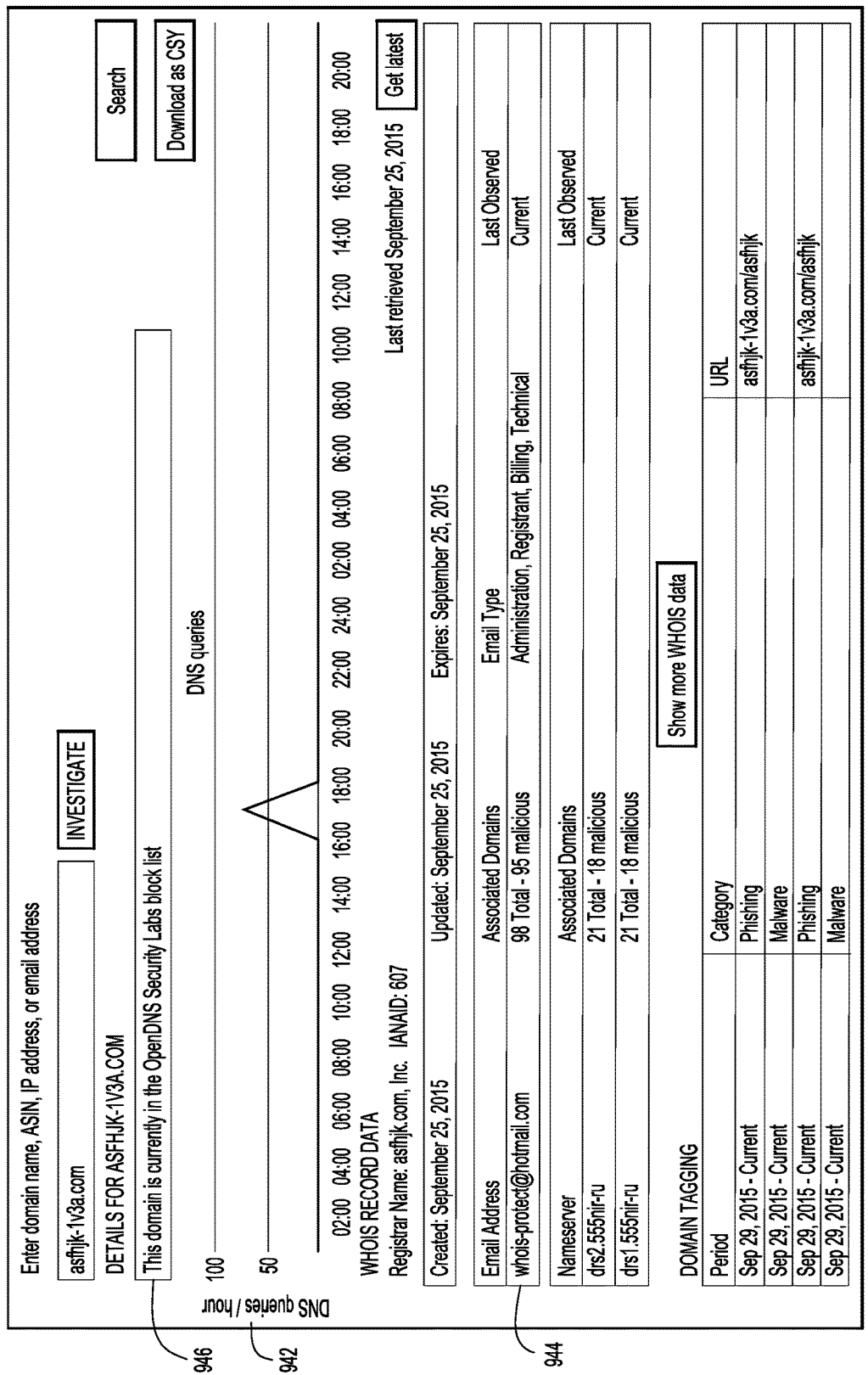
Figure 9E:
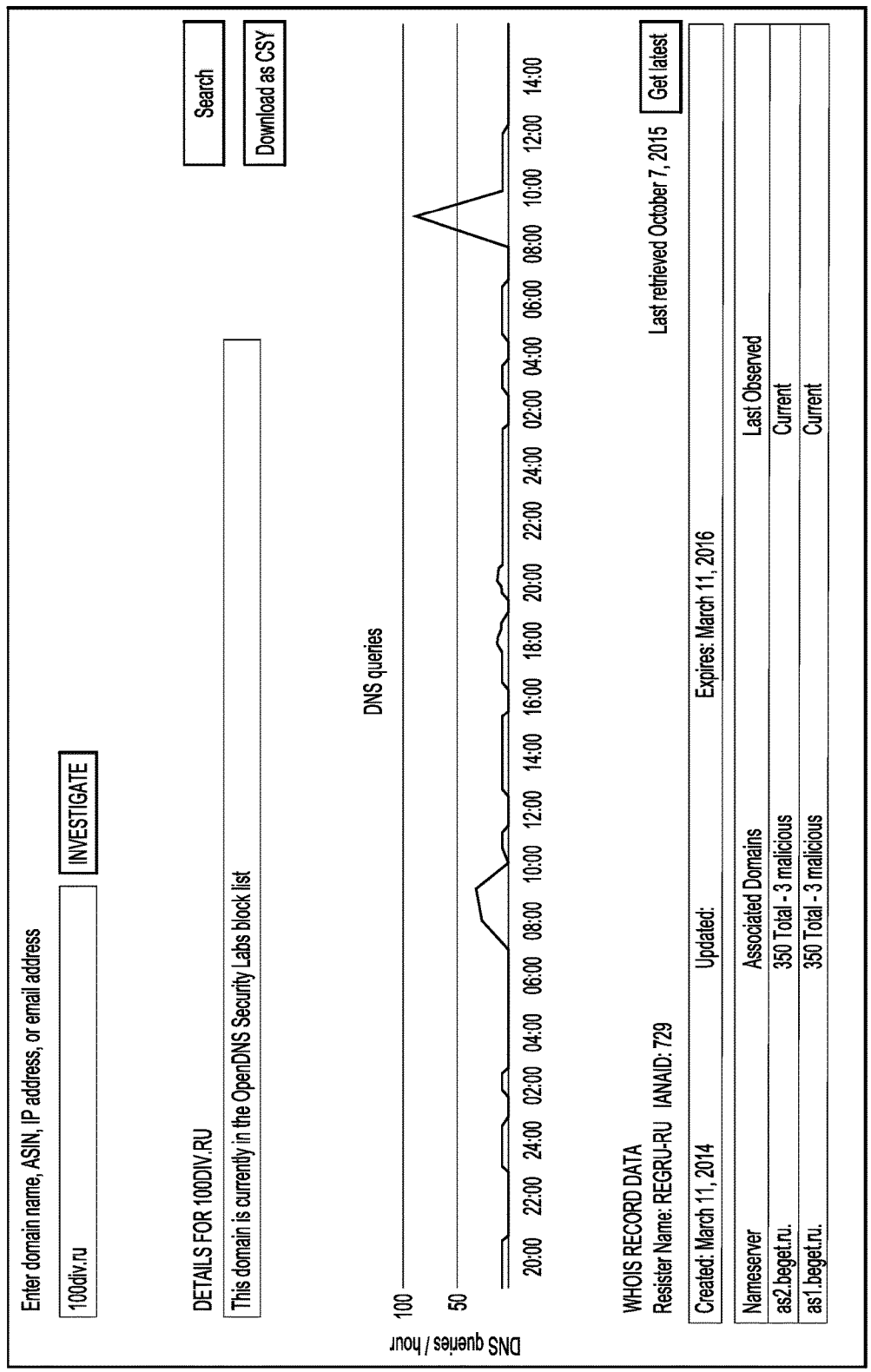

FIGS. 9C-9E each show graphs of DNS traffic over time in the context of a user interface. First, in FIG. 9C, user interface 920 includes a graph 922 that displays DNS traffic from a nuclear exploit kit. As is typically the case, the domain associated with the exploit kit has little or no history and then the DNS traffic suddenly spikes. As discussed above, simply detecting a spike does not detect malicious activity; however, here the spike includes nameserver queries that are associated with malicious domains, as is shown at 924. In particular, the spike includes queries from: ns01.abccisconetworks.com, which is known to host at least 40 malicious domains; ns02.abccisconetworks.com, which is known to host at least 40 malicious domains; ns03.abccisconetworks.com, which is known to host at least 40 malicious domains; and ns04.abccisconetworks.com, which is known to host at least 39 malicious domains. Moreover, as shown at 926, the investigated domain resolves to an IP address that is currently blocked because the IP address is on a black list and because the domain is currently on a black list for being associated with an exploit kit. These determinations may each have been made during an analysis performed on the domain and associated IP address by the SD and CDD subsystems in accordance with the techniques presented herein and/or by consulting previous determinations made by the SD and CDD subsystems for similar domains.

Second, in FIG. 9D, user interface 940 includes a graph 942 that displays DNS traffic from a domain associated with a phishing operation. Again, the domain has little or no DNS traffic history and then the DNS traffic suddenly spikes. Here, the detected spike is supplemented by the detection of a malicious registrant email address, malicious nameservers and domain tagging, as is shown at 944. Specifically, nameserver dre2.5555mir.ru is found in the spike and known to be associated with at least 18 malicious domains, nameserver dre1.5555mir.ru is found in the spike and known to be associated with at least 18 malicious domains, and the registrant email address of whois-protect@hotmail.com is associated with at least 95 malicious domains. Moreover, the domain has existing tags for phishing and malware. In view of all of these features, the domain has been added to a black list, as indicated at 946. Again, these determinations may each have been made during an analysis performed on the domain and associated IP address by the SD and CDD subsystems in accordance with the techniques presented herein and/or by consulting previous determinations made by the SD and CDD subsystems for similar domains.

Third, and finally, in FIG. 9E, a user interface 960 includes a graph 962 that displays DNS traffic from a non-malicious domain. By comparison with graphs 942 and 922, the domain has DNS traffic history with a previous spike. Consequently, additional features in the spike must provide a significant indication of malicious activity. In this instance, each of the detected nameservers is only associated with 3 malicious domains (out of 350 total) and no other malicious indications have been found in the traffic data. Consequently, the spike is determined to be a non-malicious spike, such as a spike associated with a blog that only posts material at specific time intervals (e.g., once a month).

Figure 10A:
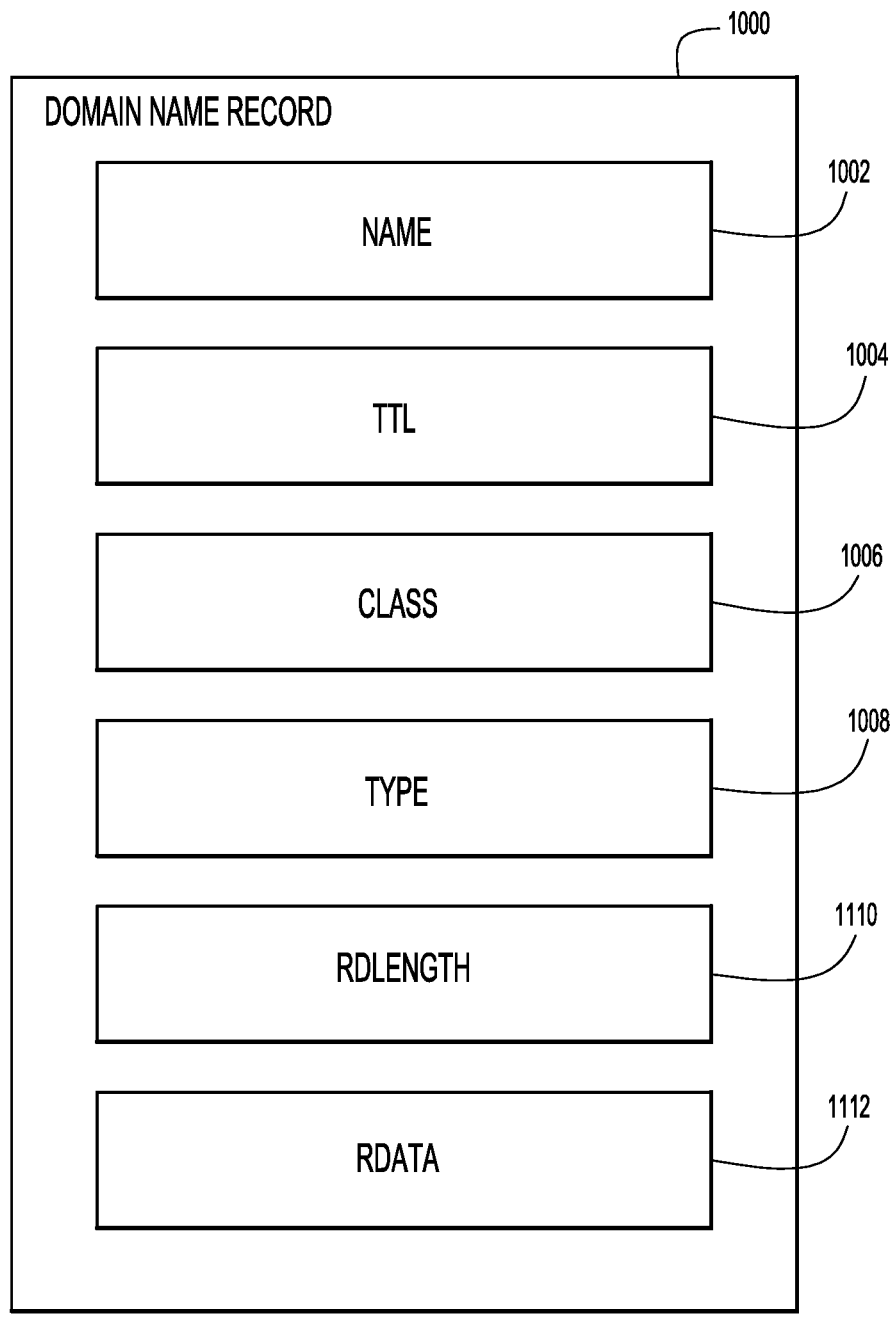
FIG. 10A depicts the structure of an example of a DNS resource record.

FIG. 10A is a block diagram 1000 depicting the structure of a domain name resource record that can be stored in the local cache at the recursive DNS clusters. Each resource record includes a name field 1002, a TTL field 1004, a class field 1006, a type field 1008, an RDLENGTH field 1010 and an RDATA field 1012. As is described above, the TTL field sets the maximum amount of time for maintaining the resource record before it should be treated as invalid and expired. In accordance with one embodiment, the RDATA field is used for various flags that may be set by the recursive nameservers to indicate some additional information about the domain in addition to the standard DNS specified information. A flag can be any indicator, marking or symbol associated with a domain name, such as a binary indicator in part of the RDATA field. The flags may have various functions, including but not limited to marking domain names as suspicious or untrustworthy, such as a web site associated with phishing activities. Flags may be used to indicate various types and levels of information. For information, social networking or pornographic web pages may be flagged so that the nameserver can provide alternate or additional information when a client issues a request.

Figure 10B:
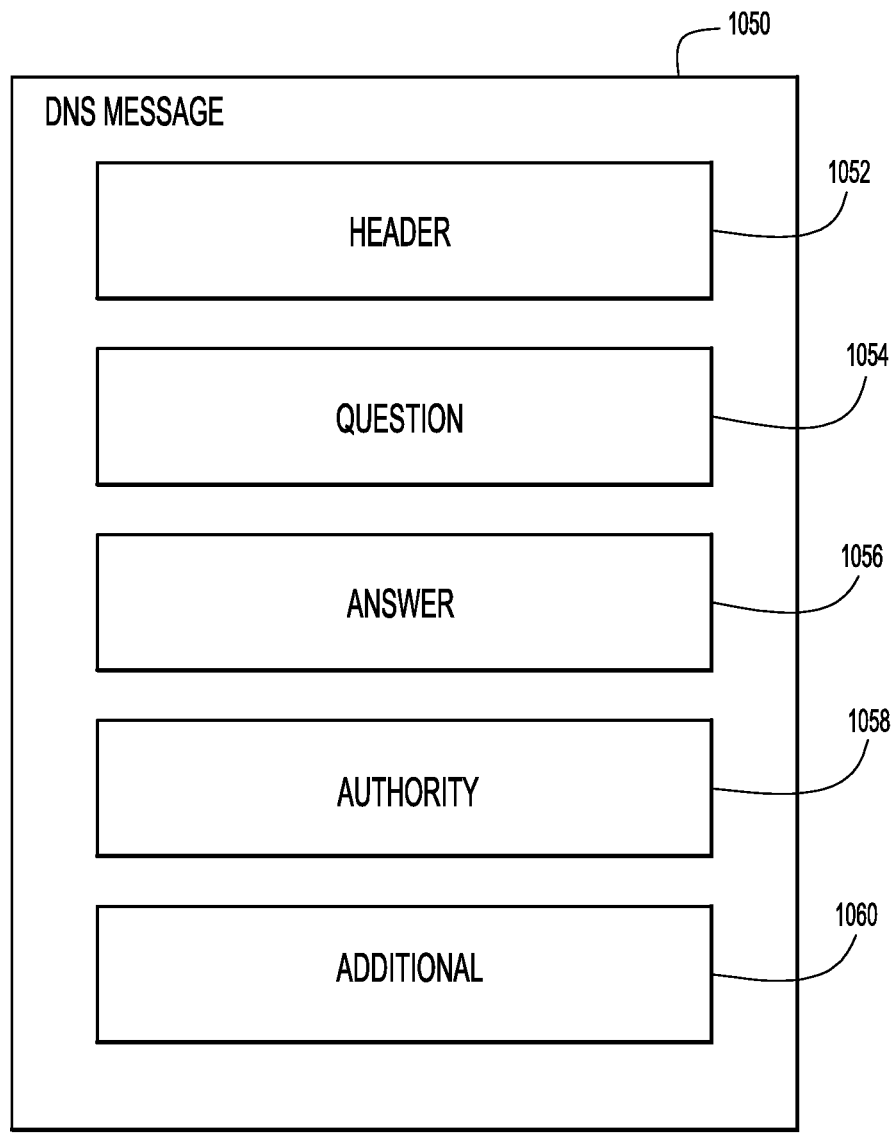
FIG. 10B depicts the structure of an example of a DNS message.

FIG. 10B is a block diagram 1050 depicting the structure of a DNS message response or request. A DNS message includes a header field 1052, a question field 1054, an answer field 1056, an authority field 1058 and an additional field 1060. The question field indicates the question for (or request) of the name server in a DNS request. The answer field in a DNS response includes one or more resource records answering a question from a DNS request. The authority field includes one or more resource records pointing to an authority. The additional field is structured like a resource record and can include various types of information, such as the subscriber identifier as described above.

Figure 11:
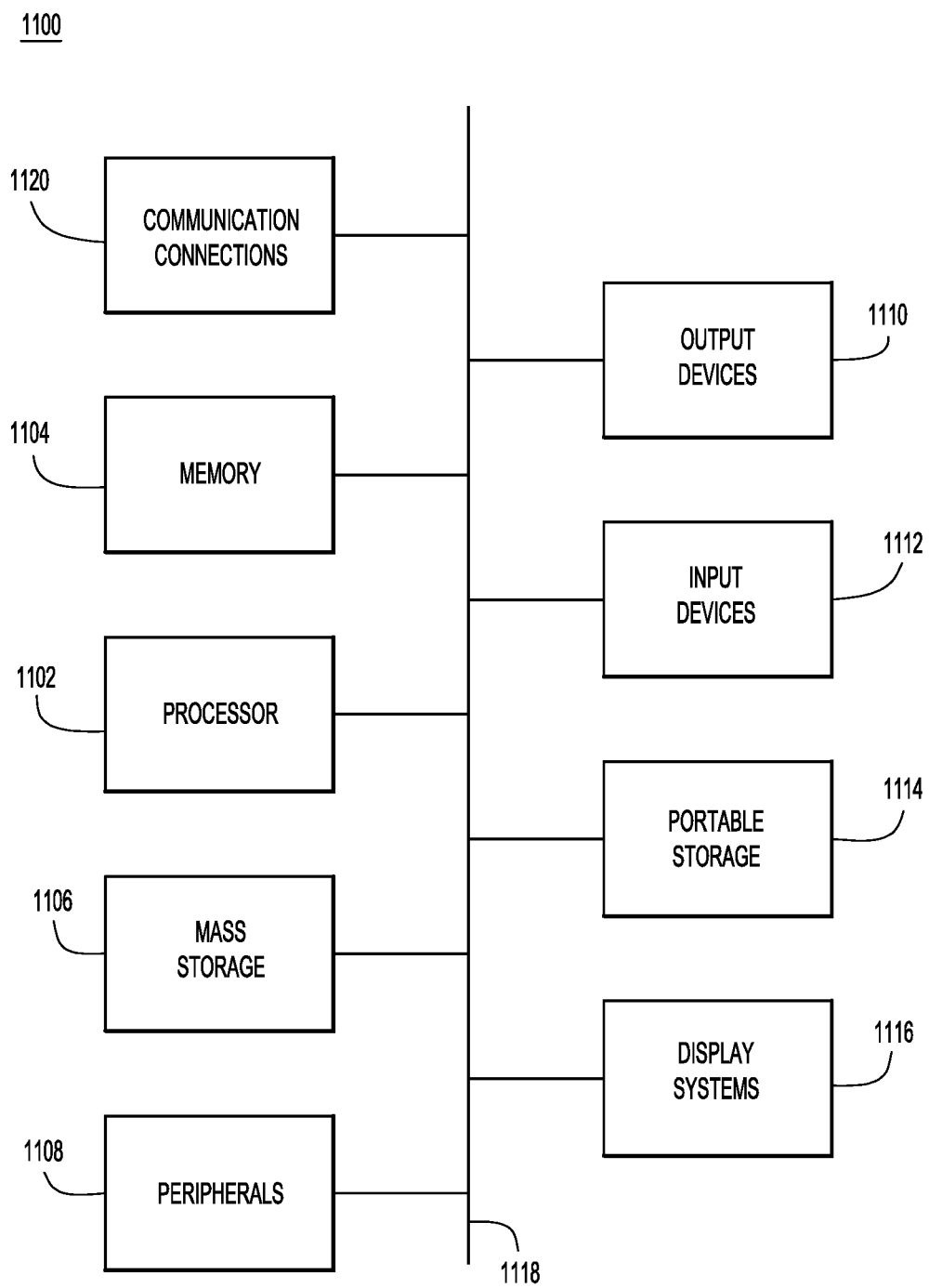
FIG. 11 is a simplified block diagram of a computing device that can be used to implement various embodiments of the disclosed technology.

FIG. 11 is a high level block diagram 1100 of a computing system which can be used to implement any of the computing devices of FIG. 7. The computing system of FIG. 11 includes processor 112, memory 1104, mass storage device 1106, peripherals 1108, output devices 1110, input devices 1112, portable storage 1114, and display system 1116. For purposes of simplicity, the components shown in FIG. 11 are depicted as being connected via a single bus 1118. However, the components may be connected through one or more data transport means. In one alternative, processor 112 and memory 1104 may be connected via a local microprocessor bus, and the mass storage device 1106, peripheral device 1108, portable storage 1114 and display system 1116 may be connected via one or more input/output buses.

Processor 112 may contain a single microprocessor, or may contain a plurality of microprocessors for configuring the computer system as a multiprocessor system. Memory 1104 stores instructions and data for programming processor 112 to implement the technology described herein. In one embodiment, memory 1104 may include banks of dynamic random access memory, high speed cache memory, flash memory, other nonvolatile memory, and/or other storage elements. Mass storage device 1106, which may be implemented with a magnetic disc drive or optical disc drive, is a nonvolatile storage device for storing data and code. In one embodiment, mass storage device 1106 stores the system software that programs processor 112 to implement the technology described herein. Portable storage device 1114 operates in conjunction with a portable nonvolatile storage medium, such as a floppy disc, CD-RW, flash memory card/drive, etc., to input and output data and code to and from the computing system of FIG. 10. In one embodiment, system software for implementing embodiments is stored on such a portable medium, and is input to the computer system via portable storage medium drive 1114.

Peripheral devices 1108 may include any type of computer support device, such as an input/output interface, to add additional functionality to the computer system. For example, peripheral devices 1108 may include one or more network interfaces for connecting the computer system to one or more networks, a modem, a router, a wireless communication device, etc. Input devices 1112 provide a portion of a user interface, and may include a keyboard or pointing device (e.g. mouse, track ball, etc.). In order to display textual and graphical information, the computing system of FIG. 9 will (optionally) have an output display system 1116, which may include a video card and monitor. Output devices 1110 can include speakers, printers, network interfaces, etc. Additionally, the computing system may also contain communications connection(s) 1120 that allow the device to communicate with other devices via a wired or wireless network. Examples of communications connections include network cards for LAN connections, wireless networking cards, modems, etc. The communication connection(s) can include hardware and/or software that enables communication using such protocols as DNS, TCP/IP, UDP/IP, and HTTP/HTTPS, among others.

The components depicted in the computing system of FIG. 11 are those typically found in computing systems suitable for use with the technology described herein, and are intended to represent a broad category of such computer components that are well known in the art. Many different bus configurations, network platforms, operating systems can be used. The technology described herein is not limited to any particular computing system.

The technology described herein, including the classification engine, can be implemented using hardware, software, or a combination of both hardware and software. The software used is stored on one or more of the processor readable storage devices described above (e.g., memory 1104, mass storage 1106 or portable storage 1114) to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any non-transitory method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware including custom integrated circuits, gate arrays, field programmable gate arrays (FPGAs), programmable logic devices (PLDs), and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers.

To summarize, in one form, a method is provided comprising: analyzing, at a server having network connectivity, traffic between one or more clients and one or more domain name system (DNS) resolvers; detecting a spike in the traffic for a particular domain; categorizing queries in the spike based on one or more query features; and classifying the particular domain based on the categorizing.

In another form, an apparatus is provided comprising: one or more network interface units configured to enable network connectivity to the Internet; a processor configured to: analyze traffic between one or more clients and one or more domain name system (DNS) resolvers; detect a spike in the traffic for a particular domain; categorize queries in the spike based on one or more query features; and classify the particular domain based on categorized queries.

In yet another form, a non-transitory computer-readable storage media is provided that is encoded with software comprising computer executable instructions and when the software is executed operable to: analyze traffic between one or more clients and one or more domain name system (DNS) resolvers; detect a spike in the traffic for a particular domain; categorize queries in the spike based on one or more query features; and classify the particular domain based on categorized queries.

Additionally, a method is provided comprising: analyzing, at a server having network connectivity, traffic between one or more domain name system (DNS) resolvers and one or more authoritative name servers hosted on the Internet; detecting, in the traffic, a mismatch between a hostname and Internet Protocol (IP) information for the hostname; and classifying domains included in the traffic based on the detecting.

In another form, an apparatus is provided comprising: one or more network interface units configured to enable network connectivity to the Internet; a processor configured to: analyze traffic between one or more domain name system (DNS) resolvers and one or more authoritative name servers hosted on the Internet; detect, in the traffic, a mismatch between a hostname and Internet Protocol (IP) information for the hostname; and classify domains included in the traffic based on detection of the mismatch.

In still yet another form, a non-transitory computer-readable storage media encoded with software comprising computer executable instructions and when the software is executed operable to: analyze traffic between one or more domain name system (DNS) resolvers and one or more authoritative name servers hosted on the Internet; detect, in the traffic, a mismatch between a hostname and Internet Protocol (IP) information for the hostname; and classify domains included in the traffic based on detection of the mismatch.

The foregoing detailed description has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method comprising:
analyzing, at a server having network connectivity, traffic between one or more domain name system (DNS) resolvers and one or more authoritative name servers hosted on the Internet;
detecting, in the traffic, an Autonomous System Number (ASN) mismatch between a hostname and a second level domain name for the hostname;
extracting an Internet Protocol (IP) address from at least one of the second level domain name and the hostname;
determining a location of the IP address in a topology of ASNs based on at least one of ASN-based routing information and allocation information determined with WHOIS information;
classifying one or more domains included in the traffic as malicious based on the detecting and the location in the topology; and
blocking traffic from the one or more domains classified as malicious.

2. The method of claim 1, further comprising:
accessing authoritative logs that contain the traffic; and
retrieving an ASN for the hostname and an ASN for the second level domain name based on the traffic included in the authoritative logs.

3. The method of claim 1, further comprising:
extracting an IP address range associated with the hostname;
determining that the IP address range associated with the hostname is a sub-allocated IP address range; and
classifying the hostname as associated with malicious activity based on the sub-allocated IP address range.

4. The method of claim 3, further comprising:
fingerprinting at least a portion of the IP address range; and
classifying the IP address range based on the fingerprinting.

5. The method of claim 1, further comprising:
analyzing traffic between the one or more DNS resolvers and one or more clients; and
wherein the classifying of the one or more domains as malicious is based on the detecting of the ASN mismatch and the analyzing of the DNS traffic between the one or more DNS resolvers and one or more clients.

6. The method of claim 1, wherein the server operates in a recursive DNS cluster.

7. An apparatus comprising:
one or more network interface units configured to enable network connectivity to the Internet;
a processor configured to:
analyze traffic between one or more domain name system (DNS) resolvers and one or more authoritative name servers hosted on the Internet;
detect, in the traffic, an Autonomous System Number (ASN) mismatch between a hostname and a second level domain name for the hostname;
extract an Internet Protocol (IP) address from at least one of the second level domain name and the hostname;
determine a location of the IP address in a topology of ASNs based on at least one of ASN-based routing information and allocation information determined with WHOIS information;

classify one or more domains included in the traffic as malicious based on detection of the mismatch and the location in the topology; and block traffic from the one or more domains classified as malicious.

8. The apparatus of claim 7, wherein the processor is further configured to:

access authoritative logs that contain the traffic; and retrieve an ASN for the hostname and an ASN for the second level domain name based on the traffic included in the authoritative logs.

9. The apparatus of claim 7, wherein the processor is further configured to:

extract an IP address range associated with the hostname;

determine that the IP address range associated with the hostname is a sub-allocated IP address range; and classify the hostname as associated with malicious activity based on the sub-allocated IP address range.

10. The apparatus of claim 9, wherein the processor is further configured to:

fingerprint at least a portion of the IP address range; and classify the IP address range based on the fingerprinting.

11. The apparatus of claim 7, wherein the processor is further configured to:

analyze traffic between the one or more DNS resolvers and one or more clients; and classify the one or more domains as malicious based on the detection of the ASN mismatch and the analyzing of the DNS traffic between the one or more DNS resolvers and one or more clients.

12. The apparatus of claim 7, wherein the apparatus operates in a recursive DNS cluster.

13. A non-transitory computer-readable storage media encoded with software comprising computer executable instructions and when the software is executed operable to:

analyze traffic between one or more domain name system (DNS) resolvers and one or more authoritative name servers hosted on the Internet;

detect, in the traffic, an Autonomous System Number (ASN) mismatch between a hostname and a second level domain name for the hostname;

extract an Internet Protocol (IP) address of at least one of the second level domain name and the hostname;

determine a location of the IP address in a topology of ASNs based on at least one of ASN-based routing information and allocation information determined with WHOIS information;

classify one or more domains included in the traffic as malicious based on detection of the mismatch and the location in the topology; and block traffic from the one or more domains classified as malicious.

14. The non-transitory computer-readable storage media of claim 13, wherein the instructions are further operable to:

access authoritative logs that contain the traffic; and retrieve an ASN for the hostname and an ASN for the second level domain based on the traffic included in the authoritative logs.

15. The non-transitory computer-readable storage media of claim 13, wherein the instructions are further operable to:

extract an IP address range associated with the hostname;

determine that the IP address range associated with the hostname is a sub-allocated IP address range; and classify the hostname as associated with malicious activity based on the sub-allocated IP address range.

16. The non-transitory computer-readable storage media of claim 15, wherein the instructions are further operable to:

fingerprint at least a portion of the IP address range; and classify the IP address range based on the fingerprinting.

17. The non-transitory computer-readable storage media of claim 13, wherein the instructions are further operable to:

analyze traffic between the one or more DNS resolvers and one or more clients; and classify the one or more domains as malicious based on the detection of the mismatch and the analyzing of the DNS traffic between the one or more DNS resolvers and one or more clients.

18. The non-transitory computer-readable storage media of claim 13, wherein the software is executed in a recursive DNS cluster.

* * * * *

UNITED STATES PATENT AND TRADEMARK OFFICE
CERTIFICATE OF CORRECTION

PATENT NO.         : 10,185,761 B2                                       Page 1 of 1
APPLICATION NO.    : 15/226250
DATED              : January 22, 2019
INVENTOR(S)        : Dhia Mahjoub et al.

It is certified that error appears in the above-identified patent and that said Letters Patent is hereby corrected as shown below:

In the Claims

Claim 14, Column 32, Line 16, please replace "domain based" with --domain name based--

Signed and Sealed this
Second Day of April, 2019

Andrei Iancu
*Director of the United States Patent and Trademark Office*